(12) United States Patent
Anisetti et al.

(10) Patent No.: US 12,683,815 B2
(45) Date of Patent: Jul. 14, 2026

(54) VERIFYING DATA INTEGRITY USING MULTIPLE BLOCKCHAINS

(71) Applicant: Open Text SA ULC, Halifax (CA)

(72) Inventors: Suresh Anisetti, Hyderabad (IN); Kanaka Srinivas Chikkala, Hyderabad (IN)

(73) Assignee: Open Text SA ULC, Halifax (CA)

( * ) Notice: Subject to any disclaimer, the term of this patent is extended or adjusted under 35 U.S.C. 154(b) by 154 days.

(21) Appl. No.: 18/337,906

(22) Filed: Jun. 20, 2023

(65) Prior Publication Data

US 2024/0430111 A1    Dec. 26, 2024

(51) Int. Cl.
    *H04L 9/00*        (2022.01)
    *H04L 9/06*        (2006.01)
(52) U.S. Cl.
    CPC .............. *H04L 9/50* (2022.05); *H04L 9/0643* (2013.01)
(58) Field of Classification Search
    CPC ........ H04L 9/50; H04L 9/0643; H04L 9/3239
    See application file for complete search history.

(56) References Cited

U.S. PATENT DOCUMENTS

| | | |
|---|---|---|
| 10,419,225 B2 | 9/2019 | Deery |
| 11,190,360 B2 | 11/2021 | Wang |
| 11,582,044 B2 | 2/2023 | Zabetian |
| 11,689,374 B1 | 6/2023 | Harrison |
| 2017/0048216 A1 | 2/2017 | Chow |

| | | | |
|---|---|---|---|
| 2018/0025181 A1* | 1/2018 | Barinov | ................ G06F 21/645 |
| | | | 726/26 |
| 2018/0219685 A1 | 8/2018 | Deery | |
| 2019/0356493 A1 | 11/2019 | Fisher | |
| 2020/0250168 A1* | 8/2020 | Xu | ...................... G06F 16/2336 |
| 2020/0250661 A1 | 8/2020 | Padmanabhan | |
| 2021/0248272 A1 | 8/2021 | Shrinivasan | |
| 2021/0328770 A1* | 10/2021 | Gaur | .................... H04L 9/0637 |
| 2022/0094698 A1* | 3/2022 | Qiu | ............................ H04L 9/50 |
| 2022/0164794 A1* | 5/2022 | Tai | ................... G06Q 20/38215 |
| 2022/0231834 A1 | 7/2022 | Das | |
| 2022/0271956 A1* | 8/2022 | Hung | ........................ H04L 9/50 |
| 2022/0278853 A1* | 9/2022 | Ben-Reuven | ......... H04L 63/123 |
| 2022/0292463 A1* | 9/2022 | Brook | ...................... H04L 9/32 |

(Continued)

OTHER PUBLICATIONS

Office Action issued for U.S. Appl. No. 18/337,937, mailed Apr. 24, 2025, 8 pages.

(Continued)

*Primary Examiner* — Blake I Narramore
(74) *Attorney, Agent, or Firm* — Sprinkle IP Law Group

(57)                ABSTRACT

Embodiments provide systems and methods for verifying data integrity on computer systems. A computer-implemented method, for example, includes obtaining a digital fingerprint for a blockchain block of an object previously stored in a first blockchain based on requesting a new block in the first blockchain, the new block automatically storing the digital fingerprint as a fingerprint of a most recent previous block to be added to the first blockchain, requesting retrieval of the obtained digital fingerprint from a second blockchain that is separate from the first blockchain, determining a validity of the obtained digital fingerprint based on a result of the requested retrieval of the obtained digital fingerprint from the second blockchain and providing a report of the determined validity.

20 Claims, 12 Drawing Sheets

(56)     References Cited

U.S. PATENT DOCUMENTS

| | | | | |
|---|---|---|---|---|
| 2022/0405260 | A1* | 12/2022 | Snow | G06F 16/27 |
| 2023/0082841 | A1* | 3/2023 | Marsh | G06Q 40/08 |
| | | | | 705/66 |
| 2023/0096457 | A1* | 3/2023 | Wang | G06F 16/2365 |
| | | | | 707/610 |
| 2023/0401526 | A1* | 12/2023 | Hu | G06Q 10/0835 |
| 2024/0193593 | A1* | 6/2024 | Zheng | H04L 9/50 |
| 2024/0405999 | A1 | 12/2024 | Racz | |
| 2024/0430111 | A1 | 12/2024 | Anisetti | |

OTHER PUBLICATIONS

Office Action issued for U.S. Appl. No. 18/337,937, mailed Oct. 21, 2025, 9 pages.
Notice of Allowance issued for U.S. Appl. No. 18/337,937, mailed Apr. 20, 2026, 12 pages.

\* cited by examiner

PRIVATE BLOCKCHAIN 102

104
106
107

108 ~ PREVIOUS BLOCK FINGERPRINT
86bc6a5d-4522-4203-a7ad-1b7c382b4f4e

110 ~ CONTENT ACTION
USER A TRANSFERRED DOCUMENT TO USER B

112 ~ Block FingerPrint: 6422bd5f-274a-452c-948e-c267fa25e310

114 ~ PREVIOUS BLOCK FINGERPRINT
6422bd5f-274a-452c-948e-c267fa25e310

116 ~ CONTENT ACTION
USER C TRANSFERRED $1 TO USER D

118 ~ Block FingerPrint: 86bc6a5d-4522-4203-a7ad-1b7c382b4f4e

100

400

406 — RETRIEVE CONTENT ACTION FROM PRIVATE BC

PRIVATE BLOCKCHAIN 402

408 — BLOCK FOR THAT ACTION

410 — ACCESS BLOCK FOR REQUESTED CONTENT ACTION

412 — REQUEST RETRIEVAL FROM PUBLIC BC USING PREVIOUS BLOCK FINGERPRINT

404 — PUBLIC BLOCKCHAIN

414 SUCCESSFULLY RETRIEVED?

NO → COMPROMISED 416

YES

418 — PRIVATE BC INFORMATION PRESUMED VALID

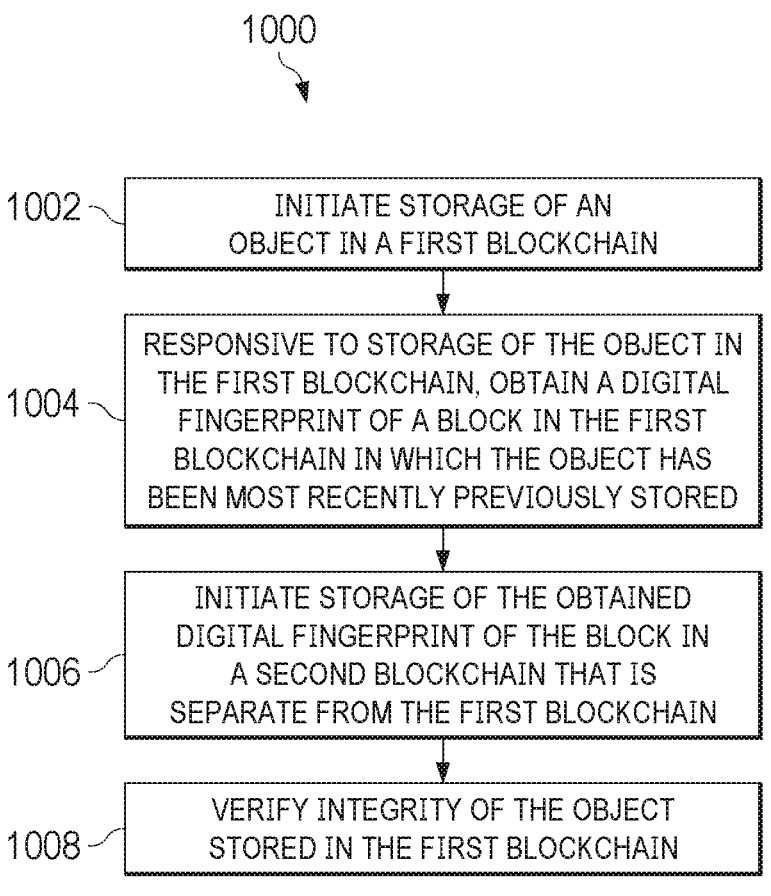

1000

1002 — INITIATE STORAGE OF AN
OBJECT IN A FIRST BLOCKCHAIN

1004 — RESPONSIVE TO STORAGE OF THE OBJECT IN
THE FIRST BLOCKCHAIN, OBTAIN A DIGITAL
FINGERPRINT OF A BLOCK IN THE FIRST
BLOCKCHAIN IN WHICH THE OBJECT HAS
BEEN MOST RECENTLY PREVIOUSLY STORED

1006 — INITIATE STORAGE OF THE OBTAINED
DIGITAL FINGERPRINT OF THE BLOCK IN
A SECOND BLOCKCHAIN THAT IS
SEPARATE FROM THE FIRST BLOCKCHAIN

1008 — VERIFY INTEGRITY OF THE OBJECT
STORED IN THE FIRST BLOCKCHAIN

FIG. 10

VERIFYING DATA INTEGRITY USING MULTIPLE BLOCKCHAINS

TECHNICAL FIELD

Embodiments of the present disclosure relate to verifying data integrity on computer systems. More particularly, embodiments relate to using multiple separate blockchains to verify data integrity. Even more particularly, some embodiments relate to verifying data integrity by comparing a current digital fingerprint of a block in a private blockchain with a previous copy of the digital fingerprint of the block. Further, some embodiments relate to verifying integrity of documents and content by comparing a current digital fingerprint of a block in a private blockchain storing the documents and content with a previous copy of the digital fingerprint of the block that is stored in a public blockchain.

BACKGROUND

Many computing systems utilize a blockchain for securely maintaining their data. Generally, a private blockchain, which may also be referred to as a permissioned blockchain, has a single operator or entity that restricts who can access the private blockchain network and whether they will be able to view and create data on the private blockchain. A blockchain generally uses a digital ledger to store contents within the blocks that comprise the chain, hence the name blockchain. The first block created is referred to as a Genesis block and each block added afterward stores a cryptographic hash (e.g., an SHA-type of hash) that refers to the previous block, allowing users to trace transactions and changes to information going back to the Genesis block. Generally, a public blockchain is decentralized, with no organization or individual in control of it, and its users can remain anonymous. Cryptocurrencies and NFTs are among its most popular use cases.

Public blockchains such as BITCOIN and ETHEREUM are widely used for many different environments for maintaining "transactions" in a ledger as stored in public blockchain blocks implemented in a public blockchain network. However, public blockchains may be controlled by multiple entities, and may be distributed over multiple nodes that are accessible by the general public computing environment.

Users concerned with restricting access to authorized users known to a single manager may prefer to securely maintain their data and transactions in a private blockchain. For example, a HYPERLEDGER FABRIC is a private blockchain that may be controlled by a single entity, and that is more centralized and not trust free. However, private blockchains may be significantly smaller than public blockchains, and may be more susceptible to data breaches and other security threats due to a limited number of validators that may be used to reach a consensus regarding validity of data prior to adding new blocks storing transactions and data. For example, a data breach in a public blockchain such as BITCOIN may occur only when data in at least 51% of the nodes of the public blockchain network is compromised. Such a data breach occurs rarely, as the number of nodes for public blockchains is typically significantly large. This is not the case with typical private blockchains, as the number of private blockchain blocks may be substantially smaller as per use case, and as controlled by the creator of the private blockchain, resulting in a loss in trust in the private blockchains.

Typical blockchains may utilize a database to store transactions. For example, HYPERLEDGER FABRIC may be implemented using COUCHDB or LEVELDB as a backend to store the transactions. The storage of typical blockchains is immutable, as the same transactions are replicated in multiple nodes. For example, when each newly added block is determined to be VALID (e.g., by consensus of the blockchain nodes), then the new block is distributed to all nodes of the blockchain network. The validation and time interval required for adding the new block may affect the integrity of the blockchain. For example, if any single entity controls more than 50% of the blockchain nodes, the single entity may be able to alter the transactions in the database before adding the new block, and the new block may be accepted by all nodes, since more than 50% of the total nodes will have the same data (e.g., consensus is reached).

The amount of time consumed in altering data may vary based on which node is being changed. For example, if 1,000 transactions are already stored in a blockchain, the amount of time consumed in order to alter the latest transaction (i.e., the most recent transaction) may be substantially smaller than the amount of time consumed for altering older transactions, because for any alteration, all top-level nodes above the altered node will also be altered. These considerations are applicable to any blockchain.

Thus, for private blockchains, data breaches may be more likely to occur, since typical private blockchains have substantially fewer nodes than typical blockchains, and since the typical private blockchains may each be controlled by a single entity. For the example, if there are 20 nodes in a HYPERLEDGER FABRIC blockchain, and if the database is updated in 11 of the 20 nodes prior to adding a new block to the blockchain, then the transactions are updated/modified, because the 11 nodes contribute more than 50% of the network of 20 nodes. Hence, there exists a need for improvements for providing greater trust in private blockchains.

SUMMARY

Embodiments of the present disclosure include systems, methods and computer program products for verifying data integrity using multiple blockchains.

Even more particularly embodiments can utilize digital fingerprints of previously stored blocks in a first blockchain to verify data integrity, where the digital fingerprints of most recently previously stored blocks are automatically obtained as a result of requesting new blocks in the first blockchain. The digital fingerprints of most recently previously stored blocks are stored in a second blockchain, for validity checking when a new block is requested for addition to the first blockchain, and the digital fingerprints of most recently previously stored blocks are automatically determined for storage in respective new blocks as a digital fingerprint of the block immediately preceding the respective new block in a sequence of blocks in the first blockchain.

In one general aspect, a method comprises obtaining a digital fingerprint for a blockchain block of an object previously stored in a first blockchain based on requesting a new block in the first blockchain, the new block automatically storing the digital fingerprint as a fingerprint of a most recent previous block to be added to the first blockchain. The method also includes requesting retrieval of the obtained digital fingerprint from a second blockchain that is separate from the first blockchain and determining a validity of the obtained digital fingerprint based on a result of the requested retrieval of the obtained digital fingerprint from the second blockchain. The method also includes providing a report of the determined validity. Other embodiments of this aspect include corresponding computer systems, apparatus, and computer programs recorded on one or more computer storage devices, each configured to perform the actions of the methods.

Some embodiments include one or more of the following features. Determining the validity of the obtained digital fingerprint may include determining that the obtained digital fingerprint is invalid, responsive to determining that the obtained digital fingerprint is not found in the second blockchain. The first blockchain may include a private blockchain and the second blockchain may include a public blockchain. The first blockchain may include a HYPERLEDGER FABRIC blockchain and the second blockchain may include a public blockchain. The digital fingerprint may include a digital fingerprint of a block included in the first blockchain. The digital fingerprint may include a hash value of a block included in the first blockchain, where the object previously stored in the first blockchain was previously stored in the block. Obtaining the digital fingerprint for the object previously stored in the first blockchain may include accessing an application programming interface (API) that is configured to interface with the first blockchain.

Another general aspect of the present disclosure includes a computer program product that comprises a non-transitory, computer-readable medium storing thereon computer-executable instructions. The computer-executable instructions may include instructions for obtaining a digital fingerprint for a blockchain block of an object previously stored in a first blockchain based on requesting a new block in the first blockchain, the new block automatically storing the digital fingerprint as a fingerprint of a most recent previous block to be added to the first blockchain. The method also includes requesting retrieval of the obtained digital fingerprint from a second blockchain that is separate from the first blockchain and determining a validity of the obtained digital fingerprint based on a result of the requested retrieval of the obtained digital fingerprint from the second blockchain. The method also includes providing a report of the determined validity. Other embodiments of this aspect include corresponding computer systems, apparatus, and computer programs recorded on one or more computer storage devices, each configured to perform the actions of the methods.

Some embodiments include one or more of the following features. Determining the validity of the obtained digital fingerprint may include determining that the obtained digital fingerprint is invalid, responsive to determining that the obtained digital fingerprint is not found in the second blockchain. The first blockchain may include a private blockchain and the second blockchain may include a public blockchain. The first blockchain may include a HYPERLEDGER FABRIC blockchain and the second blockchain may include a public blockchain. The digital fingerprint may include a digital fingerprint of a block included in the first blockchain. The digital fingerprint may include a hash value of a block included in the first blockchain, where the object previously stored in the first blockchain was previously stored in the block. Obtaining the digital fingerprint for the object previously stored in the first blockchain may include accessing an application programming interface (API) that is configured to interface with the first blockchain.

Another general aspect includes a computer-implemented method that comprises initiating storage of an object in a first blockchain. Responsive to storage of the object in the first blockchain, a digital fingerprint of a block in the first blockchain in which the object has been most recently previously stored in the first blockchain may be obtained.

The computer-implemented method includes initiating storage of the obtained digital fingerprint of the block in a second blockchain that is separate from the first blockchain. Integrity of the object stored in the first blockchain may be verified based on initiating retrieval of the object from the first blockchain, and determining whether a retrieved block digital fingerprint of the first blockchain that is obtained as a result of the initiated retrieval of the object from the first blockchain is stored in the second blockchain. Other embodiments of this aspect include corresponding computer systems, apparatus, and computer programs recorded on one or more computer storage devices, each configured to perform the actions of the methods.

Some embodiments include one or more of the following features. Verifying integrity of the object stored in the first blockchain may include determining that the retrieved block digital fingerprint is invalid, responsive to determining that the retrieved block digital fingerprint is not stored in the second blockchain. The first blockchain may include a private blockchain and the second blockchain may include a public blockchain. The first blockchain may include a HYPERLEDGER FABRIC blockchain and the second blockchain may include a public blockchain. The digital fingerprint may include a hash value of the block in the first blockchain. Initiating storage of the object in the first blockchain may include accessing an application programming interface (API) that is configured to interface with the first blockchain.

Another general aspect includes a computer-implemented method comprising receiving a hash of a document. The hash of the document is stored in a block of a protected block chain. A unique identifier for the block of the protected block chain is generated. The unique identifier is stored in a public block chain. Other embodiments of this aspect include corresponding computer systems, apparatus, and computer programs recorded on one or more computer storage devices, each configured to perform the actions of the methods.

Some embodiments include one or more of the following features. The document may be validated, the validating comprising retrieving the unique identifier from the block of the protected block chain based on the hash of the document, determining whether the unique identifier is stored in the public block chain, and when the unique identifier is determined to be stored in the public block chain, determining that the document valid. When the unique identifier is determined not to be stored in the public block chain, determining that the document is invalid. When the unique identifier is stored in a block of the public block chain, validating the document may include retrieving a block index for the block of the protected block chain, retrieving a block index for the block of the public block chain, and determining that the document is valid further based on a comparison of the block index for the block of the protected block chain and the block index for the block of the public block chain. Validating the document further may include retrieving a number of blocks in the protected block chain, retrieving a number of blocks in the public block chain, and determining that the document is valid further based on a comparison of the number of blocks in the protected block chain and the number of blocks in the public block chain. The block of the protected block chain may include a plurality of protected blocks and the public block chain may include a plurality of public blocks, validating the document may further comprise traversing the protected block chain and the public block chain to determine whether the unique identifier of each protected block is stored in a corresponding public block. The hash of the document is received from a document management system, the method further comprising returning a result that the document is valid to the document management system. Receiving the hash of the document is in response to a first user of the document management system accessing the document. Validating of the document is in response to a second user of the document management system accessing the document, where the first and the second user do not have access to the protected block chain. Metadata is associated with the document, the method further comprising storing the metadata associated with the document in the block of the protected block chain and retrieving the metadata associated with the document from the block in the protected block chain based on the document hash.

In another general aspect, a system may include a processor, and a non-transitory memory coupled to the processor and having instructions executable by the processor for receiving a hash of a document, storing the hash of the document in a block of a protected block chain, generating a unique identifier for the block of the protected block chain, and storing the unique identifier in a public block chain. Other embodiments of this aspect include corresponding computer systems, apparatus, and computer programs recorded on one or more computer storage devices, each configured to perform the actions of the methods.

Some embodiments include one or more of the following features. The instructions are further executable by the processor for validating the document, the validating comprising retrieving the unique identifier from the block of the protected block chain based on the hash of the document, determining whether the unique identifier is stored in the public block chain, and when the unique identifier is determined to be stored in the public block chain, determining that the document is valid. The instructions are further executable by the processor for: when the unique identifier is determined not to be stored in the public block chain, determining that the document is invalid. The unique identifier is stored in a block of the public block chain, the instructions are further executable by the processor for retrieving a block index for the block of the protected block chain, retrieving a block index for the block of the public block chain, and determining that the document is valid further based on a comparison of the block index for the block of the protected block chain and the block index for the block of the public block chain. Validating the document further may comprise retrieving a number of blocks in the protected block chain, retrieving a number of blocks in the public block chain, and determining that the document is valid further based on a comparison of the number of blocks in the protected block chain and the number of blocks in the public block chain. The block of the protected block chain may include a plurality of protected blocks and the public block chain may include a plurality of public blocks, validating the document may comprise traversing the protected block chain and the public block chain to determine whether the unique identifier of each protected block is stored in a corresponding public block. The hash of the document is received from a document management system, the instructions further executable by the processor for returning a result that the document is valid to the document management system. Receiving the hash of the document is in response to a first user of the document management system accessing the document. Validating of the document is in response to a second user of the document management system accessing the document, where the first and the second user do not have access to the protected block chain.

Metadata is associated with the document, the instructions further executable by the processor for storing the metadata associated with the document in the block of the protected block chain, and retrieving the metadata associated with the document from the block in the protected block chain based on the document hash.

In another general aspect, a method may include, at a document manager, generating a hash for a document, where the document is associated with metadata describing the document. A record may be generated in a first block chain accessible only by the document manager, the record storing the hash and the metadata and having a unique identifier. A record may be generated in a second block chain, the record in the second block chain having the unique identifier. In response to a transaction on the document, validating the document, the validating comprising returning the unique identifier for the record in the first block chain, and searching for the unique identifier in the second block chain. When the unique identifier is found in the second block chain and further based on the metadata, determining that the document is valid. Other embodiments of this aspect include corresponding computer systems, apparatus, and computer programs recorded on one or more computer storage devices, each configured to perform the actions of the methods.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore non-limiting, embodiments illustrated in the drawings, wherein identical reference numerals designate the same components. Note that the features illustrated in the drawings are not necessarily drawn to scale.

FIG. 10 is a flowchart illustrating one embodiment of a method for verifying data integrity for data stored in a private blockchain.

DETAILED DESCRIPTION

Figure 1:
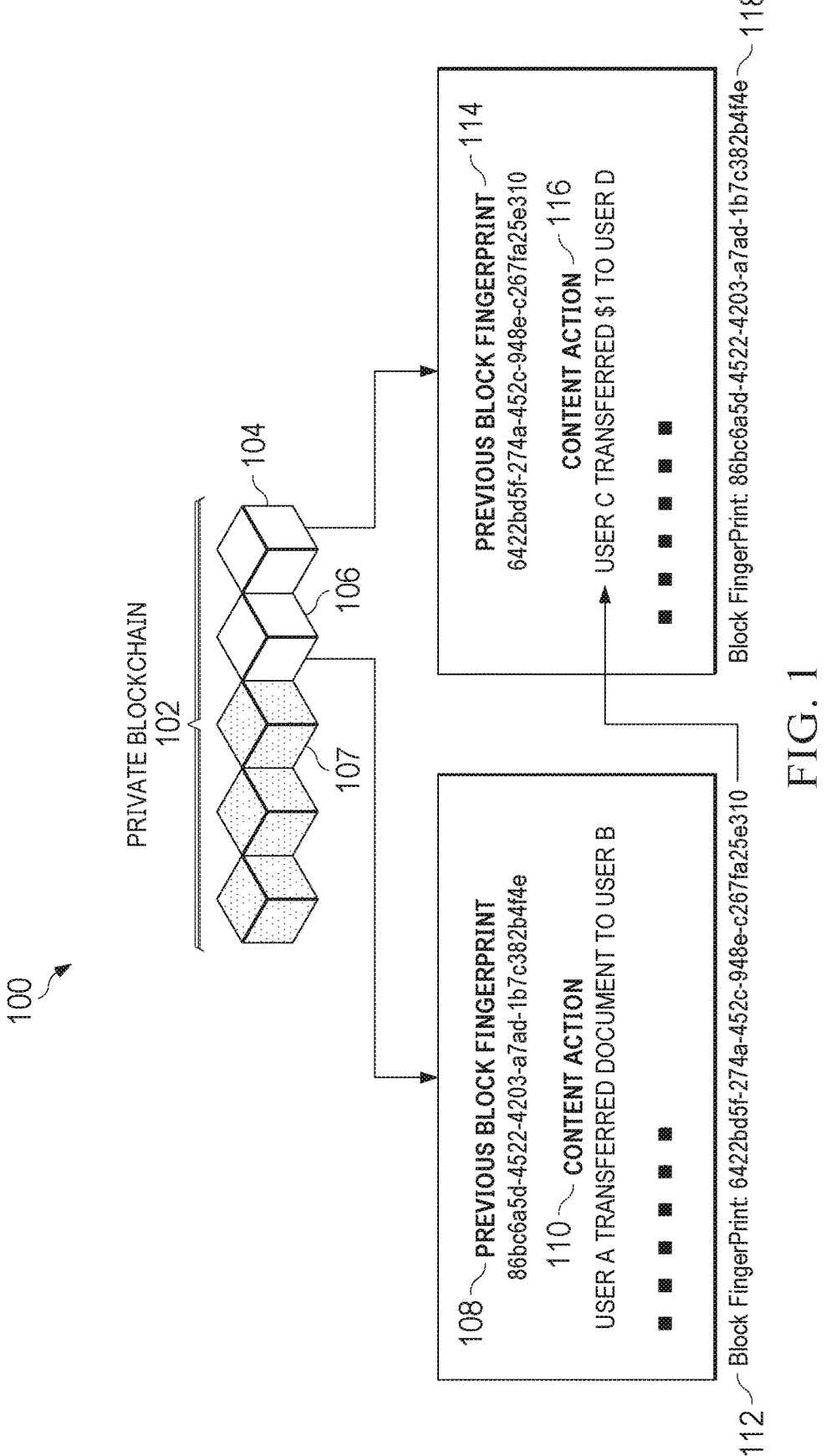
FIG. 1 is a diagrammatic representation of one embodiment of representative content of two consecutive blocks in a sequence of blocks in a blockchain.

The invention and the various features and advantageous details thereof are explained more fully with reference to the non-limiting embodiments that are illustrated in the accompanying drawings and detailed in the following description. Descriptions of well-known starting materials, processing techniques, components, and equipment are omitted so as not to unnecessarily obscure the invention in detail. It should be understood, however, that the detailed description and the specific examples, while indicating some embodiments of the invention, are given by way of illustration only and not by way of limitation. Various substitutions, modifications, additions, and/or rearrangements within the spirit and/or scope of the underlying inventive concept will become apparent to those skilled in the art from this disclosure.

Embodiments provide systems and methods for verifying data integrity using multiple blockchains. Typical service providers may need to provide secure storage for objects (e.g., content, files, documents, etc.) for consumers, or users, of their services/products. For example, content management systems and document management systems such as an OPENTEXT CORE CONTENT system may provide secure storage for documents and metadata that is accessible to users using blockchain technology. For example, a private blockchain, such as a HYPERLEDGER FABRIC blockchain, may provide a protected blockchain for authorized system users.

For example, OPENTEXT CORE CONTENT may provide a combination of content management, process automation and integration into applications that power everyday business processes. In addition to storing content (e.g., documents, metadata, etc.) in the private blockchain, a second blockchain is used to verify data integrity by storing only unique identifiers of blocks in the private blockchain. For example, a public blockchain may be used as the second blockchain, thus minimizing risks of data breaches caused by having a majority of nodes of the private blockchain controlled by a single entity. When a user adds a new block to the private blockchain, a reference block (e.g., a block fingerprint, unique identifier) is added in the public blockchain. The reference block stores only block fingerprints (unique identifiers) of blocks in the private blockchain, and does not store any transactions data, which aids in maintaining data privacy. Data in the private blockchain can then be audited using the block fingerprints stored in the public blockchain, in combination with information stored in the private blockchain.

For example, a user may upload documents (e.g., invoices, contracts, etc.) to a document management system, which may also store metadata such as an identification of the uploading user, descriptions of the documents, etc. The system may generate a hash of the uploaded document and initiate storage of the document hash and the metadata in the private blockchain. By using a document hash, data security may be improved, as well as efficiency of storage in the private blockchain (e.g., saving system storage resources such as bandwidth, processor usage, storage capacity, etc.). When a new private block is added to the private blockchain, a corresponding new public block is added to the public blockchain, the new public block storing only the digital fingerprint of the newly added private block (e.g., a hash of the newly added block). The new private block also stores a digital fingerprint of the most recently previously added private block in the private blockchain. The user may validate the document or metadata at any point of time, and validation may be performed at the time of any addition to the private blockchain, by obtaining, from the private blockchain, a block fingerprint of a previously stored block in the private blockchain, and searching for the obtained block fingerprint in the public blockchain. If the obtained block fingerprint is not found in the public blockchain, then a status value indicating a "compromised" status may be returned to the requesting user. This type of binary determination of the "compromised" state may further conserve processing resources, as an authentication of each node may consume considerably more processing time and bandwidth.

FIG. 1 is a diagrammatic representation of one embodiment of representative content 100 of two consecutive blocks in a sequence of blocks in a blockchain. As shown in FIG. 1, a private blockchain 102 is represented as a sequence of blocks, ordered in the sequence by ordering of most recently added blocks. Thus, block 104 is shown as the most recently added block, and block 106 as the second most recently added block. Block 106 stores a previous block fingerprint 108 and a representation of a content action 110. As shown, the previous block fingerprint 108 indicates a digital fingerprint of a block 107 that was most recently added to private blockchain 102 prior to the addition of block 106. A digital fingerprint 112 is shown as a digital fingerprint of block 108. When a request is received to add new block 104, instructions of a private contract are executed to obtain consensus (e.g., more than fifty percent of private blockchain 102 users verify and confirm legitimacy of a requested content action for an object associated with the private blockchain 102 (e.g., a document managed by a content management system), prior to storing (i.e., adding) the new block 104 in the private blockchain 102. The newly added block 104 then stores previous block fingerprint 114 (i.e., the digital fingerprint 112 of most recently previously stored block 106) and content action 116 (i.e., the requested content action verified and confirmed by consensus of users of private blockchain 102. A digital fingerprint 118 is shown as a digital fingerprint of block 104.

As shown in FIG. 1, content action 110 represents an action depicted as "User A transferred document to User B," while content action 116 represents an action depicted as "User C transferred \$1 to User D." Thus, private blockchain 102 tracks transactions as requested by particular users, with each new transaction (i.e., content action) to be verified and confirmed by consensus of users of private blockchain 102, in accordance with instructions stored in the private contract. The private contract is stored in the private blockchain 102 when private blockchain 102 is initialized, to ensure that transactions for private blockchain 102 are managed in accordance with an agreement established by particular users of the private blockchain 102.

For example, when a new content action is requested, a private blockchain network storing nodes of the private blockchain 102 accesses the appropriate private contract instructions to obtain consensus and establish a new private blockchain block for the requested new content action. For the example of FIG. 1, the digital fingerprint of the most recently previously added block is automatically obtained, to be stored in the new block as the previous block fingerprint (e.g., storing block fingerprint 112 as previous block fingerprint 114 stored in new block 104). Further, block fingerprint 118 of newly added block 104 is generated. For example, block fingerprint 118 may be determined as a hash value of the contents of new block 104. For example, block fingerprint 112 may be determined as a hash value of the contents of previous block 106. For example, the previous block fingerprint 108 may have been determined as a hash value of the contents of block 107, which is the most recently added previous block to block 106.

According to some embodiments, the newly generated block fingerprint 118 of newly added block 104 may be stored in a second blockchain (e.g., a public blockchain), for utilization in verifying data integrity of private blockchain 102. According to some embodiments, a current "previous block fingerprint" value is automatically determined and is immutably stored in each newly added block of private blockchain 102, at the time of requesting addition of the new block. Thus, when a next new block is requested, instructions of the private contract may be executed to obtain consensus, and automatically obtain a current "previous block fingerprint" value for storage in the newly requested block, and therefore, that "previous block fingerprint" value may be searchable in the second blockchain (e.g., a public blockchain) for verifying data integrity of the current private blockchain 102. For example, if that "previous block fingerprint" value is not found as a result of a search in the second blockchain, then it may be presumed that the current private blockchain 102 is compromised, in accordance with the presumption that the block fingerprint of the most recently previously stored block would have been stored in the second blockchain at the time of that block's storage in private blockchain 102.

Figure 2:
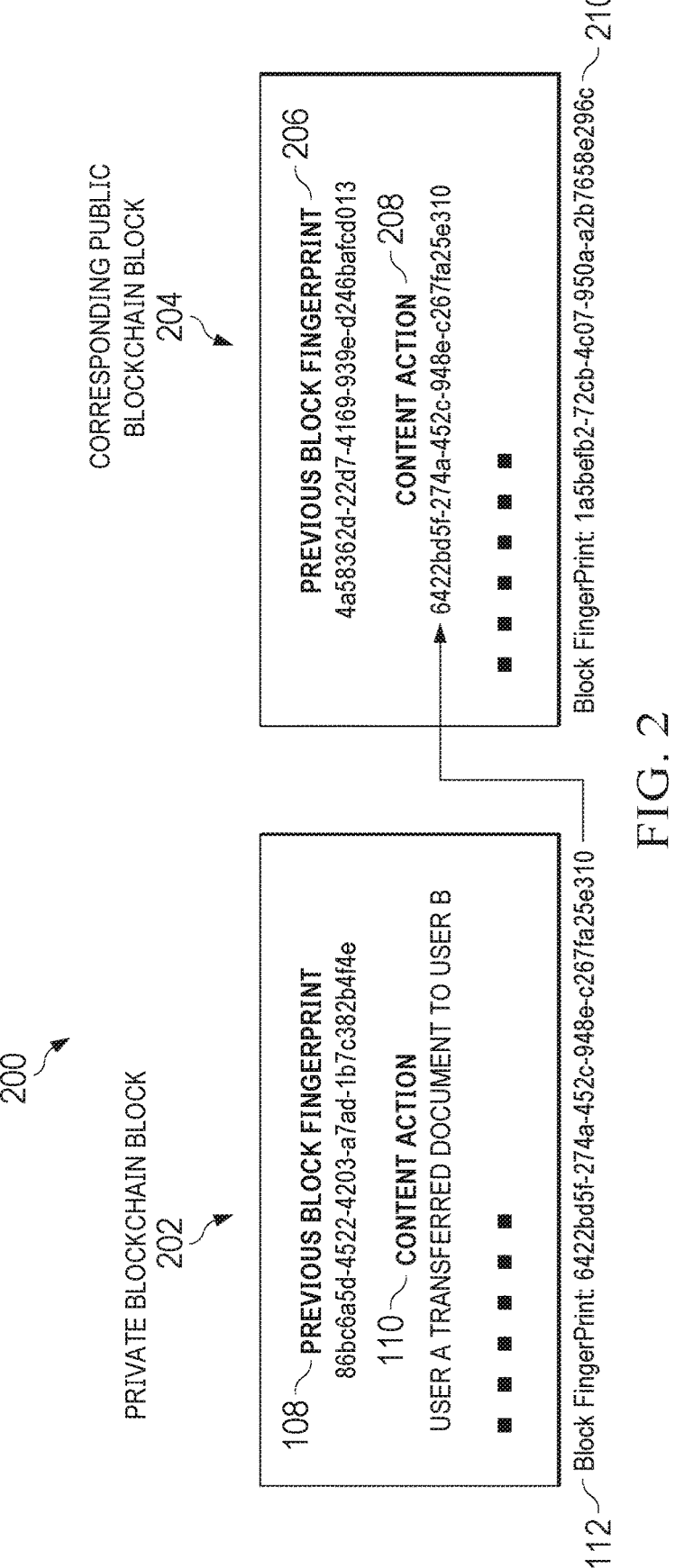
FIG. 2 is a diagrammatic representation of one embodiment of representative content of a block in a private blockchain and a corresponding public block in a public blockchain.

FIG. 2 is a diagrammatic representation of one embodiment of representative content 200 of a block in a private blockchain and a corresponding public block in a public blockchain. As shown in FIG. 2, private blockchain block 202 corresponds to corresponding public blockchain block 204. As shown in FIG. 2, private blockchain block 202 stores the previous block fingerprint 108 and the representation of a content action 110, as discussed above with regard to block 106 of private blockchain 102. As shown, the previous block fingerprint 108 indicates the digital fingerprint of block 107 that was most recently added to private blockchain 102 prior to the addition of block 106. The digital fingerprint 112 is shown as the digital fingerprint of block 108, as discussed above. At the time of addition of private blockchain block 202 (e.g., block 106) to private blockchain 102, the digital fingerprint 112 (e.g., a hash value of the contents of block 106, at the time of addition of block 106 to private blockchain 102) may be provided for storage in a public blockchain, resulting in storage of public blockchain block 204 in the public blockchain.

As shown in FIG. 2, public blockchain block 204 stores its previous block fingerprint 206 and the representation of a content action 208, which stores only the digital fingerprint 112 (e.g., the hash value of the contents of block 106, at the time of addition of block 106 to private blockchain 102), according to some embodiments. As shown, the previous block fingerprint 206 indicates the digital fingerprint of a block that was most recently added to the public blockchain prior to the addition of block 202. A digital fingerprint 210 is shown as the digital fingerprint of public blockchain block 204 (e.g., a hash value of the contents of public blockchain block 204). In some embodiments, the content action 208 is immutably stored in the public blockchain block 204 of the public blockchain. In accordance with a smart contract for the public blockchain, the public blockchain may be searched by a public blockchain user for the content action 208, for example, to verify data integrity of the private blockchain 102.

Figure 3:
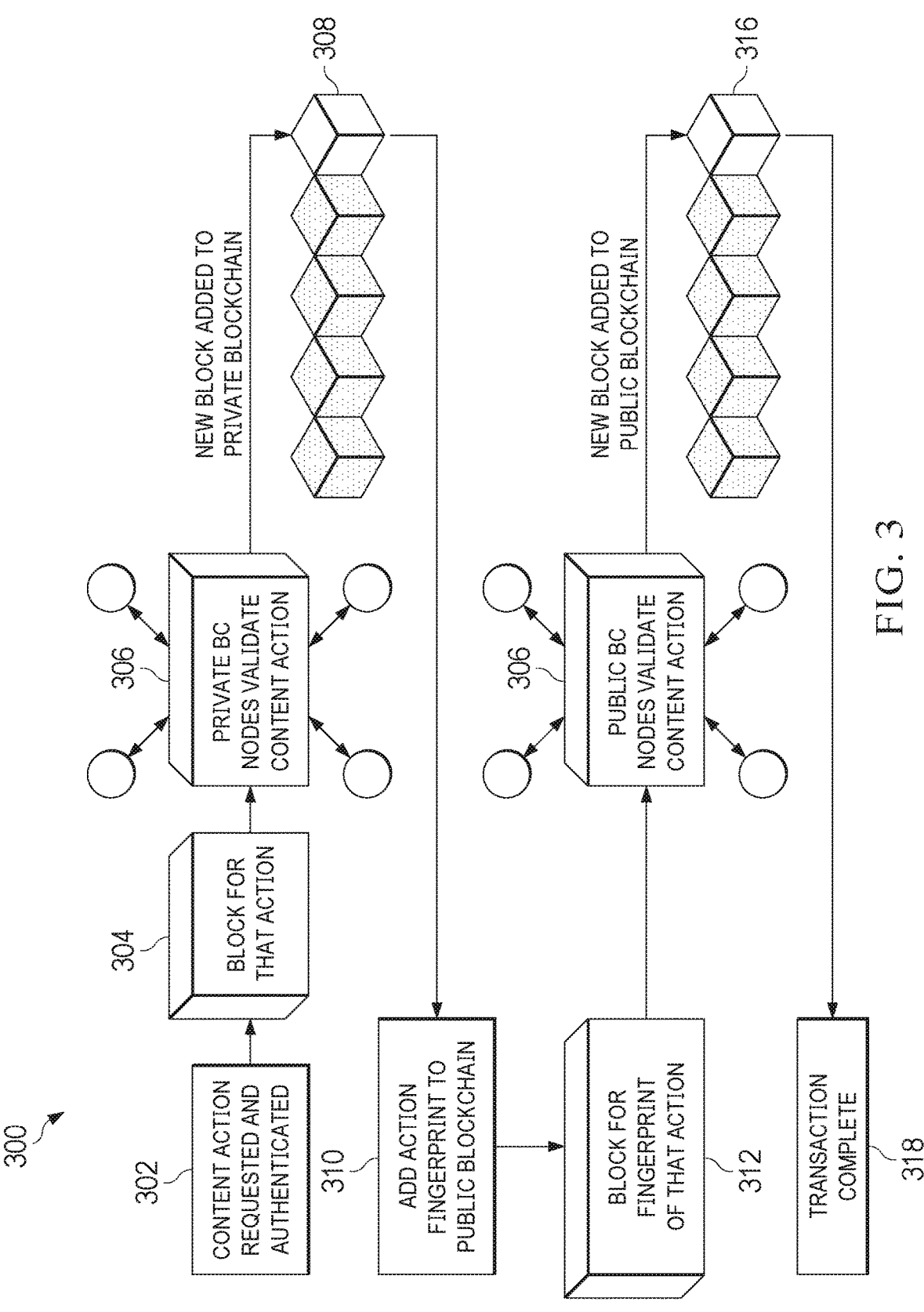
FIG. 3 is a diagrammatic representation of one embodiment of a system flow for adding a new transaction to a private blockchain according to some embodiments.

FIG. 3 is a diagrammatic representation of one embodiment of a system flow 300 for adding a new transaction to a private blockchain according to some embodiments. As shown in FIG. 3, a content action (e.g., a transaction on content) is requested and authenticated 302 by the system flow 300. A block 304 (e.g., private blockchain block 202) for the requested content action is requested (e.g., for requested content action 110). At flow step 306, a consensus is requested of users of the private blockchain (e.g., nodes of private blockchain 102) for the requested content action (e.g., content action 110). As shown in FIG. 3, the nodes of the private blockchain validate the content action (e.g., reach consensus for validation). A new block 308 is then added to the private blockchain for the requested and authenticated content action. For example, private blockchain block 202 may be added to the private blockchain 102.

At flow step 310, the block fingerprint of the requested content action (e.g., block fingerprint 112, for content action 110) is added to the public blockchain. A block 312 (e.g., public blockchain block 204) for the requested content action is requested (e.g., for requested content action 208). At flow step 314, a consensus is requested of users of the public blockchain (e.g., nodes of the public blockchain) for the requested content action (e.g., content action 208). For example, the consensus may be obtained in accordance with instructions provided in a smart contract stored in the public blockchain. As shown in FIG. 3, the nodes of the public blockchain validate the content action (e.g., reach consensus for validation). A new block 316 is then added to the public blockchain for the requested and authenticated content action. For example, public blockchain block 204 may be added to the public blockchain. At flow step 318, the transaction is complete, and a status may be reported to a requestor of the content action.

Figure 4:
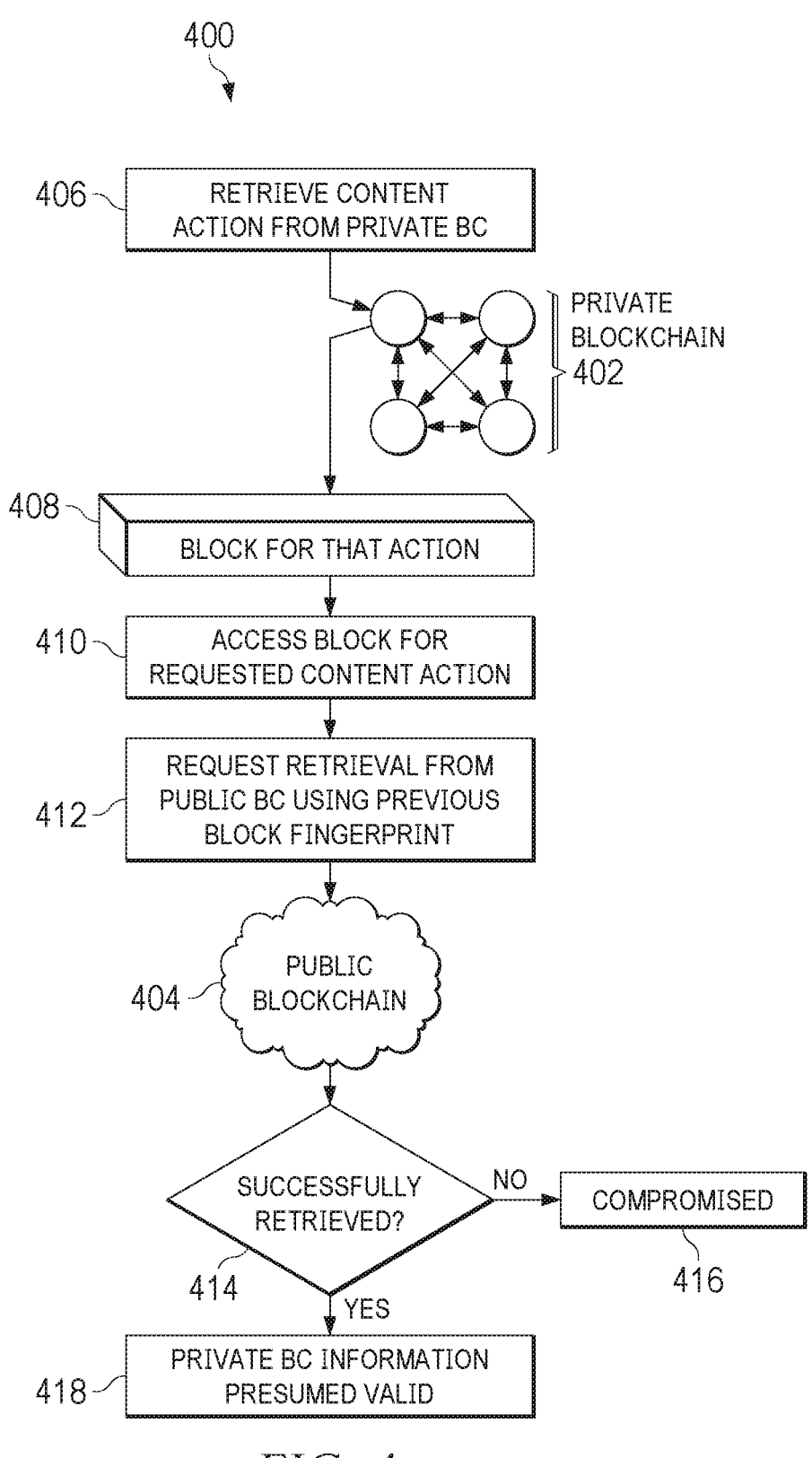
FIG. 4 is a diagrammatic representation of one embodiment of a system flow for retrieving and validating a transaction according to some embodiments.

FIG. 4 is a diagrammatic representation of one embodiment of a system flow 400 for retrieving and validating a transaction according to some embodiments. As shown in FIG. 4, at flow step 406, a content action (e.g., content action 116) is requested for retrieval from a private blockchain 402 (e.g., private blockchain 102). A block 408 (e.g., block 104) for the requested content action is accessed from private blockchain 402, at flow step 410. At flow step 412, using the previous block fingerprint of the accessed block (e.g., previous block fingerprint 114 of block 104), retrieval of the previous block fingerprint (e.g., previous block fingerprint 114) is requested from the public blockchain 404.

At flow step 414, responsive to a result of the requested retrieval of the previous block fingerprint (e.g., previous block fingerprint 114) from the public blockchain nodes, a determination is made whether the private blockchain is compromised 416, or the private blockchain information is presumed valid 418. For example, responsive to not finding the previous block fingerprint (e.g., previous block fingerprint 114 of private blockchain 102) in the public blockchain, it may be presumed that the block fingerprint of block 106 of private blockchain 102 has changed since the storage of block fingerprint 112 as content action 208 in corresponding public blockchain block 204 (at the time of initially storing block 104 in private blockchain 102), as discussed above with regard to FIG. 2, and thus, the information may be presumed to be compromised. As discussed above, previous block fingerprint 114 was immutably stored in block 104 of private blockchain 102 after block 106 was stored, and thus the previous block fingerprint 114 was determined by the private blockchain 102 for storage in block 104, later than the block fingerprint 112 was determined by the private blockchain 102 (i.e., at the time of storage of block 106).

Figure 5:
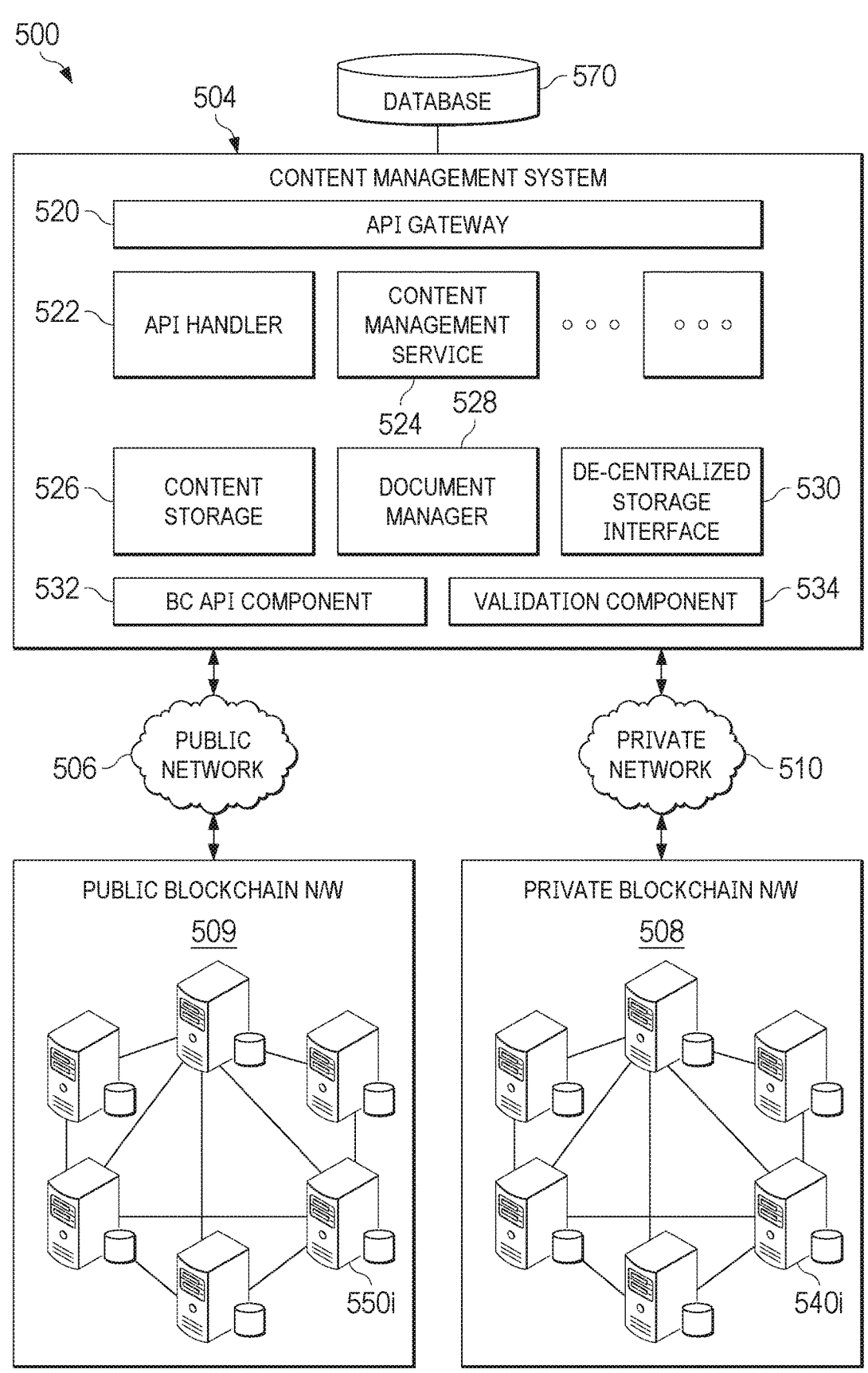
FIG. 5 depicts a diagrammatic representation of a distributed network computing environment where embodiments disclosed herein can be implemented.

FIG. 5 is a diagrammatic representation of one embodiment of a distributed network computing environment 500 for verifying data integrity. Distributed network computing environment 500 includes a content management system (CMS) 504, a private blockchain network 508, and a public blockchain network 509. The CMS 504 is bi-directionally connected to the private blockchain network 508 via a private network 510, and to the public blockchain network 509 via the public network 506. In some embodiments, the CMS 504 may include an OPENTEXT CORE CONTENT system. In some embodiments, the CMS 504 may include a document management system. In some embodiments, the CMS 504 includes an application programming interface (API) gateway 520, an API handler 522, a content management service 524, content storage 526, a document manager 528, and a decentralized storage I/F 530. The API gateway 520 can act as an API front-end, receives API requests, enforces throttling and security policies, passes requests to back-end services and then passes any responses back to a requester. In some embodiments, the API gateway 520 may comprise a server. In some embodiments, the API gateway 520 may also provide functions such as collecting analytics data and providing caching. The API gateway 520 can provide the functionality to support authentication, authorization, security, audit and regulatory compliance. API handler 522 comprises instructions that handle incoming requests and provide appropriate responses to an Application Programming Interface (API). APIs can be used to enable communication between different software applications, services, or systems. In some embodiments, API handler 522 acts as middleware that receives requests from a client and processes them, then sends back a response to the client. API handler 522 may be implemented as a standalone function or as part of a larger application. Example responsibilities of API handler 522 may include validating, parsing, and routing incoming API requests to the appropriate service or function that can handle the request. API handler 522 can also check the authenticity of the requests by verifying an API key, authentication credentials, and other security measures. In some embodiments, a blockchain API component 532 comprises a smart contract interface for managing requests for interactions with the private blockchain network and the public blockchain network. In some embodiments, CMS 504 may include the blockchain API component 532. In some embodiments, blockchain API component 532 that manages blockchain interactions is implemented as a portal or component separate from the CMS 504.

Content management service 524 can include any of a number of services provided by content management systems, including but not limited to, content capture and processing, payroll, human resources applications, document management, project management, contracts management, accounts receivable, accounts payable, etc. In some embodiments, content storage 526 may be implemented as a content repository that stores content and associated metadata. In some implementations, content metadata may be stored separately from associated content. A content validation component 534 manages validation of transactions stored in private blockchain network 508, as discussed further herein. Database 570 can comprise one or more databases configured to store and retrieve data, such as the content (e.g., documents) and metadata discussed herein. Decentralized storage I/F 530 provides functionality to enable communication between a first client device and other devices operating within the private blockchain network 508 and/or the public blockchain network 509.

The private blockchain network 508 includes a plurality of network devices 540i that are networked via the private blockchain network 508 for communicating among the plurality of network devices 540i, as well as communicating via interfaces with the CMS 504. For example, when the CMS 504 requests, at runtime, that an action regarding a document be recorded in the private blockchain network 508, the document manager 528 obtains the document and its associated metadata (e.g., metadata describing the document), obtains a hashed version of the document (i.e., a document hash value), and initiates transmission of the document hash value to the private blockchain network 508 via blockchain API component 532. The document hash value and the metadata are then transmitted via the private network 510 to one or more of the network devices 540i for storage and verification of security status using the private blockchain and the public blockchain. In one example embodiment, the private blockchain network 508 is implemented as an InterPlanetary File System peer-to-peer (P2P) network that implements HYPERLEDGER FABRIC BLOCKCHAIN.

The public blockchain network 509 includes a plurality of network devices 550i that are networked via the public blockchain network 509 for communicating among the plurality of network devices 540i, as well as communicating via interfaces with the CMS 504. For example, when the CMS 504 requests, at runtime, that an action regarding a document be recorded in the private blockchain network 508, the document manager 528 obtains the document and its associated metadata, obtains a hashed version of the document (i.e., a document hash value), and initiates transmission of the document hash value to the private blockchain network 508 via blockchain API component 532. The document hash value and the metadata is then transmitted via the private network 510 to one or more of the network devices 540i for storage and verification of security status using the private blockchain and the public blockchain. A digital signature of the private block in the private blockchain, in which the document hash and metadata are stored, is obtained. The blockchain API component 532 then requests storage of the obtained digital signature of the private block in the public blockchain stored in the public blockchain network 509. When the storage in the public blockchain, of the obtained digital signature of the private block, is successful, a public block fingerprint hash value is obtained via the blockchain API component 532, where the public block fingerprint hash value comprises a hash of the content of the public blockchain block in which the obtained digital signature of the private block, has been stored. The blockchain API component 532 then provides to the document manager 528 a status value for the document hash and metadata stored in the private blockchain, where the status value indicates a "secure" status. The document manager 528 then stores the status in the CMS 504, for example, by setting a status flag to indicate a currently "secure" status. The document handler may use any of a number of hash techniques to obtain the document hash, e.g., an SHA type hash (secure hash algorithm) may provide hashes with fewer collisions than less secure techniques. In some example embodiments, the public blockchain comprises an ETHEREUM blockchain.

Figure 6:
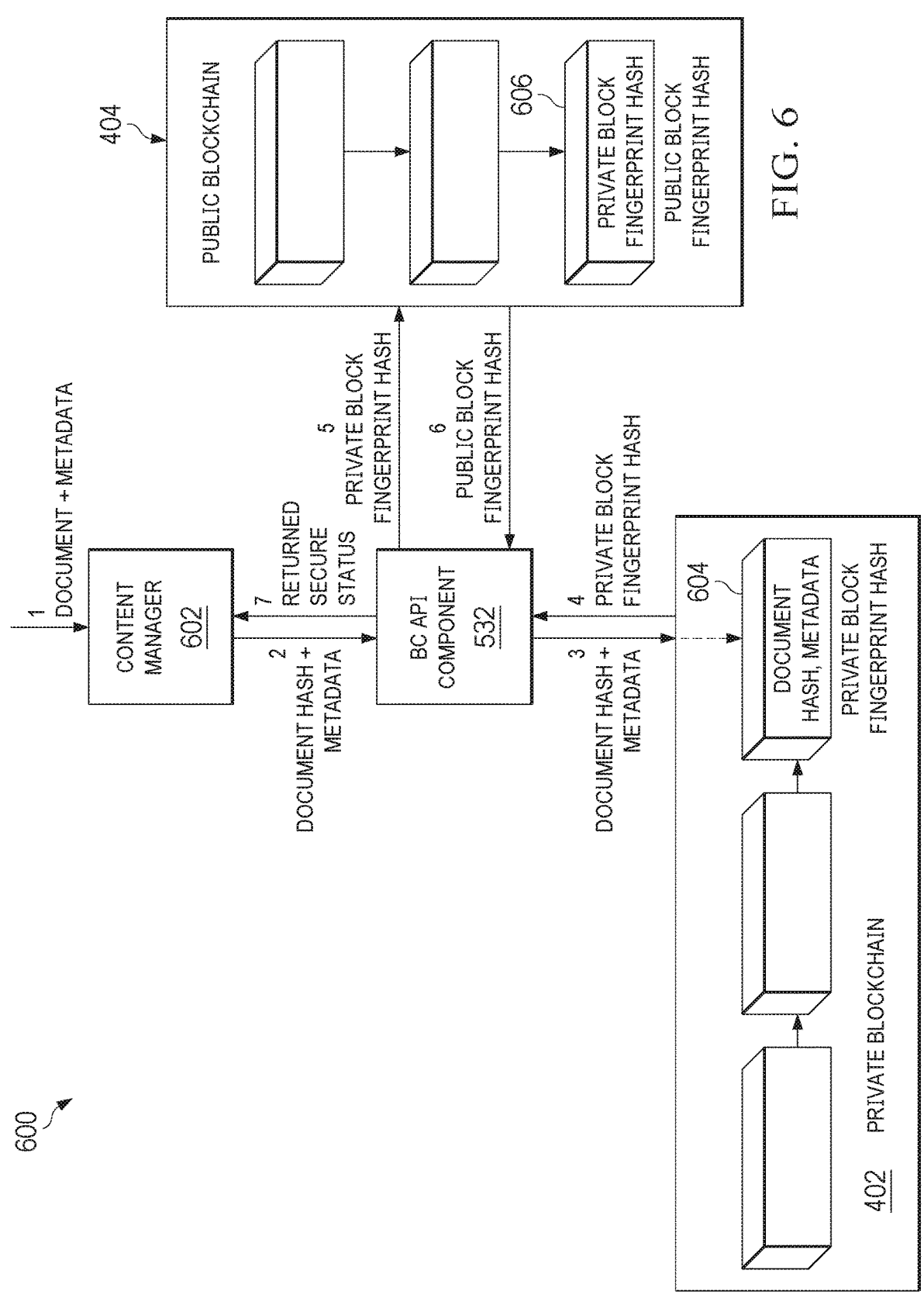
FIG. 6 is a diagrammatic representation of one embodiment of a system for adding a new transaction to a private blockchain according to some embodiments.

FIG. 6 is a diagrammatic representation of one embodiment of a system flow 600 for adding a new transaction to a private blockchain according to some embodiments. As shown in FIG. 6, a document, and associated metadata describing the document, is obtained by a content manager 602. For example, the document manager 528 may obtain the document and metadata as a result of a request of a client of CMS 504 regarding the document. The content manager 602 generates a hash value for the document and provides the document hash and the metadata to the blockchain API component 532. For example, the document manager 528 may obtain the hash value for the document and access the blockchain API component 532, providing the document hash and the metadata to the blockchain API component 532 for interaction with the private blockchain 402 (e.g., provided by the private blockchain network 508) and the public blockchain 404 (e.g., provided by the public blockchain network 509). For example, the document manager 528 may generate the document hash, or may request the hash value from a service from, may request the hash value from a separate component of the CMS 504, or may receive the hash value from the requesting client of the CMS 504.

Via the blockchain API component 532, the content manager 602 initiates generation of a record in the private blockchain 402, where the record stores the document hash and the metadata. For example, the document manager may initiate storage of the document hash and the metadata in a new block 604 (e.g., the record) private blockchain 402. As discussed previously, as the new block 604 is added, a private block fingerprint is generated (e.g., in accordance with the smart contract for the private blockchain 402, the private block fingerprint generated as a hash of the new block 604). For example, the private block fingerprint may serve as a unique identifier for the new block 604. The blockchain API component 532 then obtains the private block fingerprint resulting from the addition of new block 604, and may then request generation of a new block 606 in public blockchain 404 by providing the private block fingerprint of new block 604 for storage in the public blockchain 404 (e.g., generating a record in the public blockchain 404, where the record comprises the private block fingerprint of new block 604), where the new block 606 stores only the private block fingerprint of new block 604.

As discussed previously, as the new block 606 is added, a public block fingerprint is generated (e.g., in accordance with the smart contract for the public blockchain 404, the public block fingerprint generated as a hash of the new block 606). As shown in FIG. 6, the blockchain API component 532 then obtains the public block fingerprint resulting from the addition of new block 606 to public blockchain 404, and may then return a status value, indicating a "secure" status of the new block 604, to the content manager 602 (e.g., the document manager 528, which may then store a status value in the CMS 504 for the new record, for example, by setting a status flag associated with the document).

Figure 7:
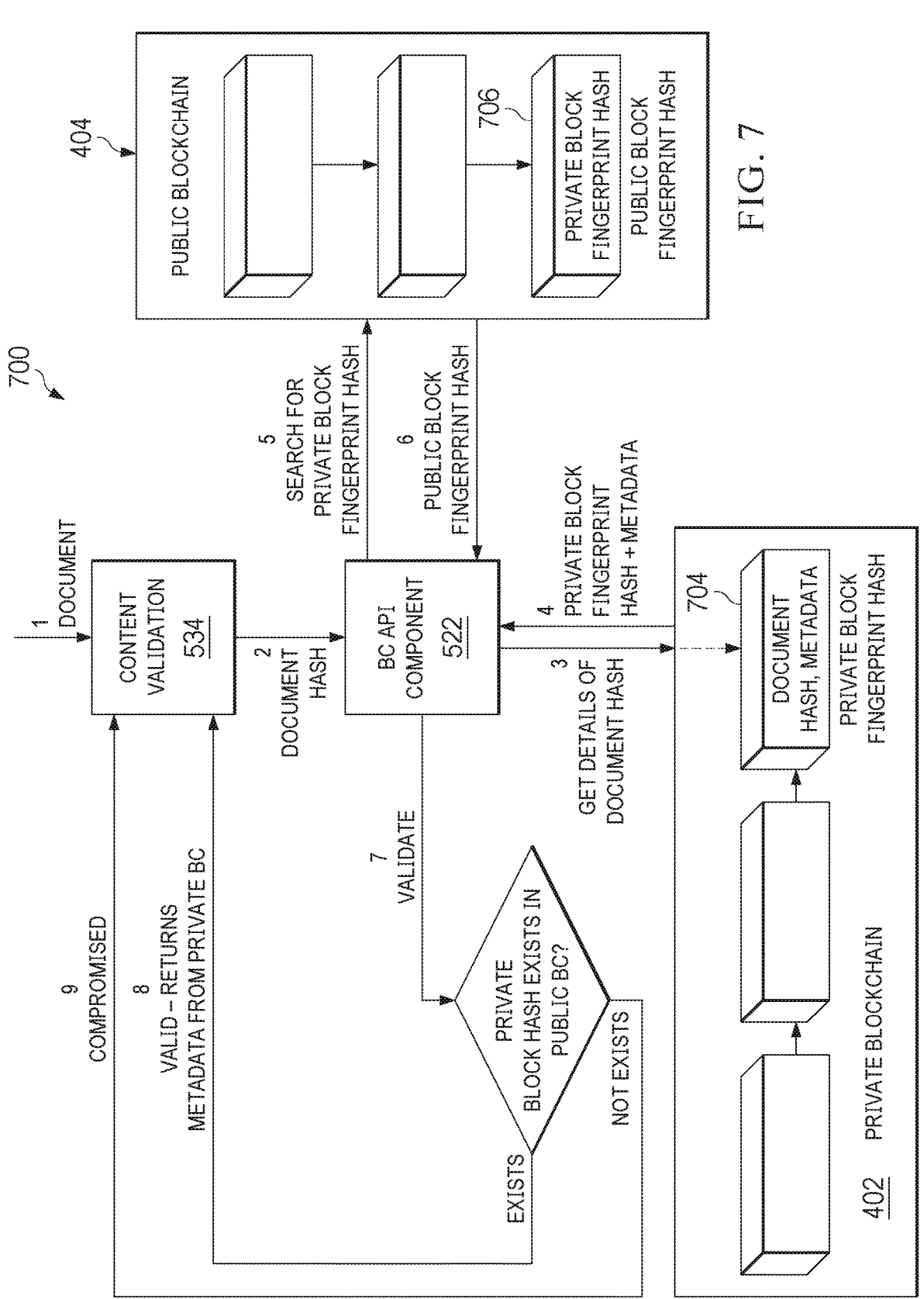
FIG. 7 is a diagrammatic representation of one embodiment of a system for validating a document according to some embodiments.

FIG. 7 is a diagrammatic representation of one embodiment of a system flow 700 for validating a document according to some embodiments. As shown in the embodiment of FIG. 7, a document is obtained by content validation component 534. In some embodiments, the content validation component is implemented as a portion of the document manager 528. In some embodiments, the content validation component 534 is implemented as a component separate from the document manager 528.

The content validation component 534 obtains a hash value for the document and provides the document hash to the blockchain API component 532. For example, the document manager 528 may obtain the hash value for the document and access the blockchain API component 532, providing the document hash to the blockchain API component 532 for interaction with the private blockchain 402 (e.g., the private blockchain 508) and the public blockchain 404 (e.g., the public blockchain network 509). For example, the document manager 528 may obtain a previously stored hash of the document, may generate the document hash as currently received, or may request the hash value from a service, may request the hash value from a separate component of the CMS 504, or may receive the hash value from the requesting client of the CMS 504.

Via the blockchain API component 532, content validation component 534 initiates a request for validation of the document by obtaining the current private block fingerprint associated with the document hash and verifying that the current private block fingerprint associated with the document hash has been previously stored in the public blockchain 404. As shown in FIG. 7, blockchain API component 532 requests the details associated with the document hash from the private blockchain. For example, the access request may initiate a new transaction (i.e., an access content action), causing private blockchain network 508 to obtain the private block fingerprint associated with the document hash, for the most recently added private block 704 associated with the document hash (i.e., for insertion as the previous block fingerprint 114 in the block 104 to be added, e.g., for the access transaction). The metadata stored in that immediate prior block (e.g., block 106, previously discussed as block 604) may be retrieved and provided to blockchain API component 532, with the private block hash (e.g., the previous block fingerprint obtained by execution of the private blockchain 402 for insertion into the current new private blockchain block associated with the document hash). Via blockchain API component 532, the newly obtained private block hash (obtained from private blockchain 402) is used as a search key for searching public blockchain 404 for a public block 706 that previously stored the newly obtained private block hash as a private block fingerprint hash (e.g., content action 208).

Responsive to searching the public blockchain 404 for the newly obtained private block hash, the public blockchain 404 provides, via the blockchain API component 532, a public block fingerprint hash for a block 706 associated with the search. Responsive to a failure to find the newly obtained private block hash stored in a previously generated public block (i.e., "not found" or "not exists"), a status value indicating a "compromised" status is returned to content validation component 534 (e.g., document manager 528). In some embodiments, document manager 528 may then store the returned status of the document in CMS 504 (e.g., setting a status flag associated with the document in CMS 504 to a value indicating a "compromised" status in the private blockchain network 508).

Responsive to finding the newly obtained private block hash stored in a previously generated public block (i.e., "found" or "exists"), a status value indicating a "valid" status is returned to content validation component 534, along with the metadata obtained from private blockchain 402. In some embodiments, document manager 528 may then store the returned status of the document in CMS 504 (e.g., setting a status flag associated with the document in CMS 504 to a value indicating a "valid" status in the private blockchain network 508). In some embodiments, document manager 528 may further check the validity based on further checking the returned metadata (e.g., determining whether the returned metadata matches metadata stored in CMS 504, or metadata newly determined for the document), and/or as discussed below.

Figure 8A:
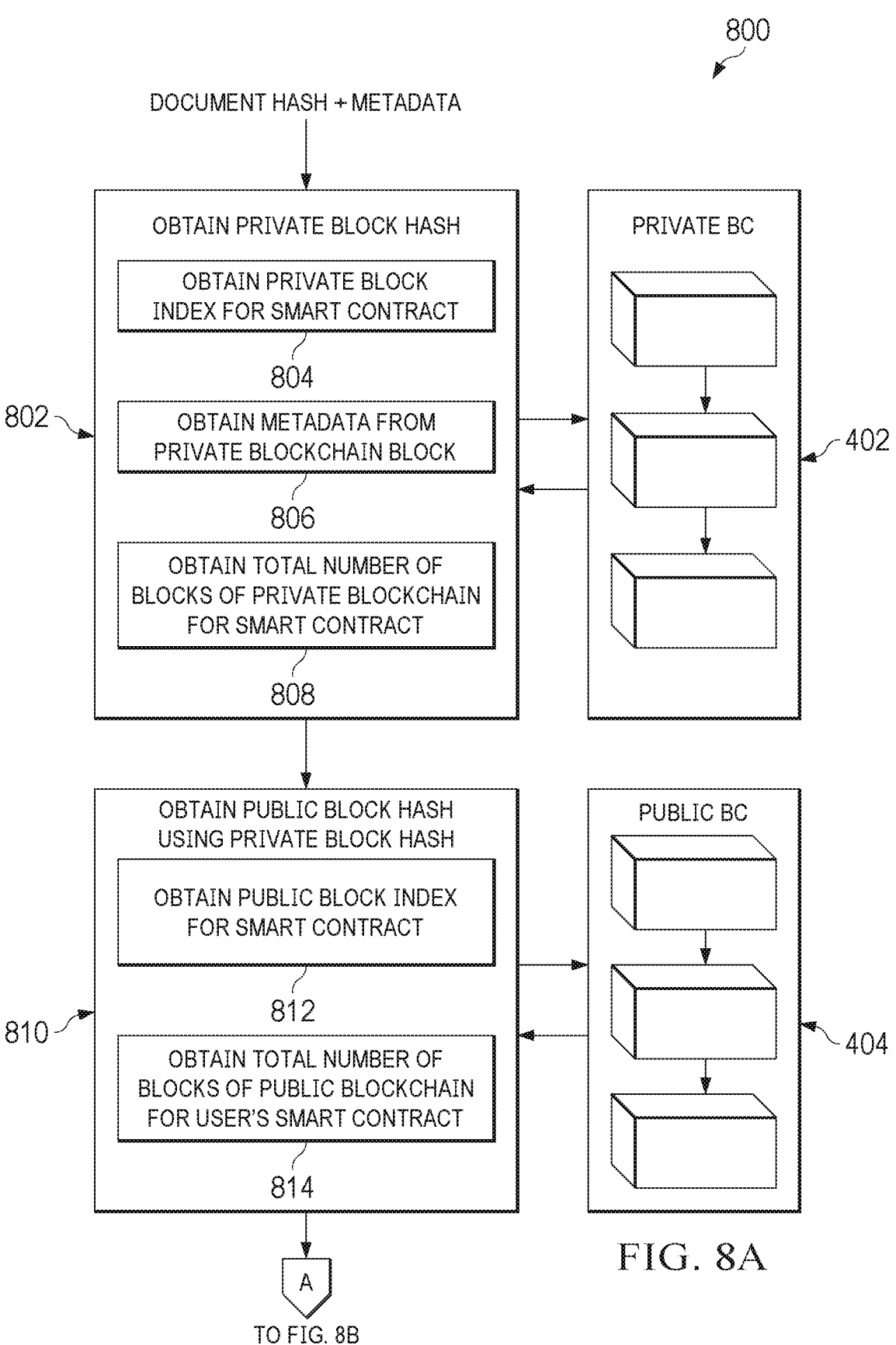
FIGS. 8A-8B are a diagrammatic representation of one embodiment of a system for verifying data integrity according to some embodiments.
Figure 8B:
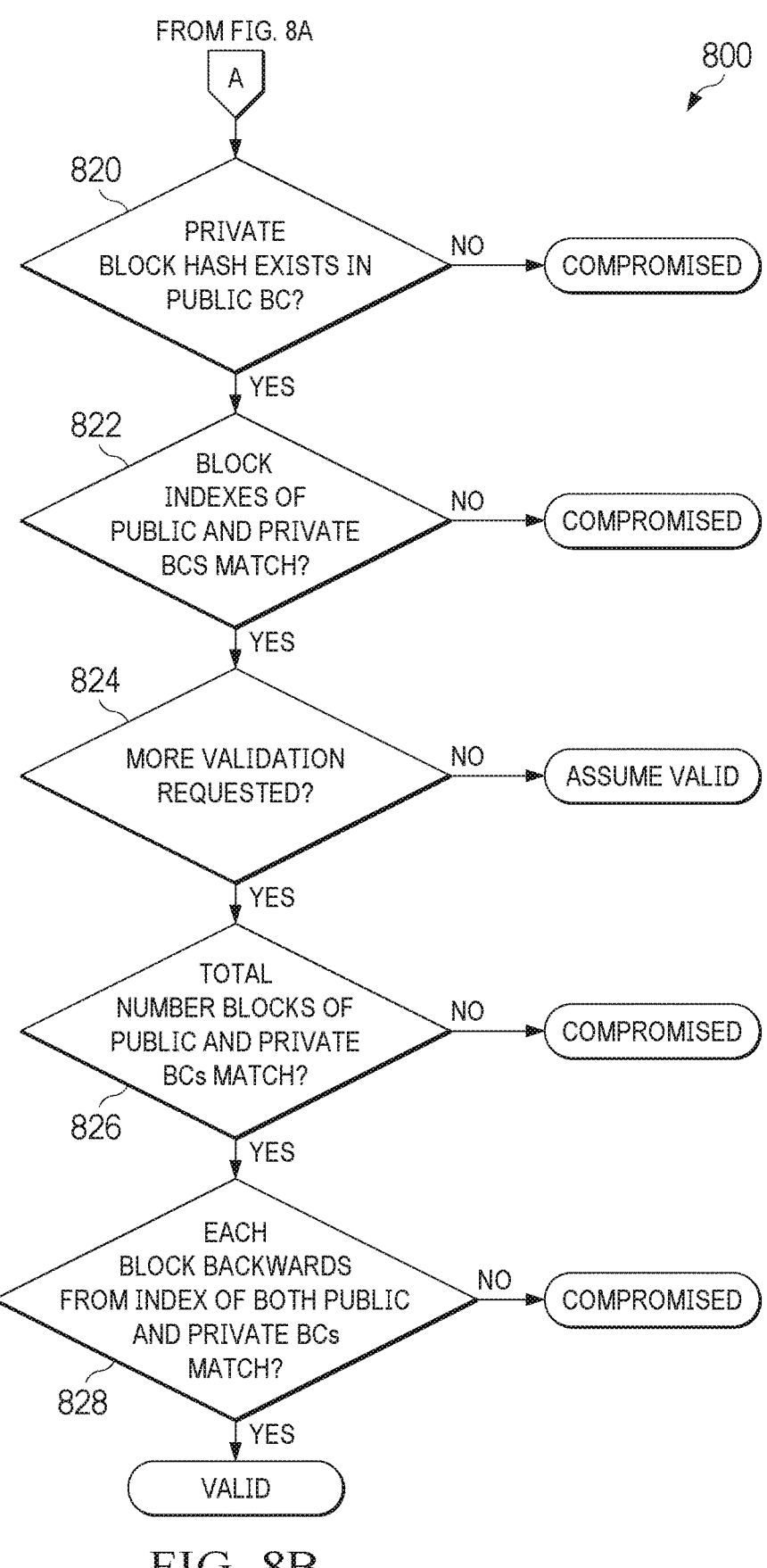

FIGS. 8A-8B are a diagrammatic representation of one embodiment of a system flow 800 for verifying data integrity according to some embodiments. FIGS. 8A-8B indicate similar processing as discussed above with regard to FIG. 7, but with more detail in further processing for determining a validity status of the document. As shown in FIG. 8A, a document hash of the document and metadata describing the document are obtained, for example, by document manager 528. At flow step 802, a private block hash is obtained from private blockchain 402. The private block hash is obtained by obtaining a private block index for the smart contract, at flow step 804, obtaining metadata associated with the document hash from a private blockchain block associated with the document hash, at flow step 806, and obtaining the current total number of block of the private blockchain 402, for the smart contract associated with the private blockchain 402 (e.g., the private contract stored in one or more blocks of the private blockchain 402), at flow step 808.

For example, as part of the processing of obtaining, via the blockchain API component 532, the private block fingerprint hash and metadata discussed with regard to FIG. 7 (and corresponding step 410 of FIG. 4), the smart contract for private blockchain 402 is accessed (and executed), and an index for the currently stored blocks of private blockchain 402 may be obtained, at flow step 804. For example, the index may be used for traversing the blocks of private blockchain 402, or for accessing a particular block of private blockchain 402 that is associated with particular information. Using the document hash, associated metadata previously stored in private blockchain 402 may be obtained, as discussed with regard to FIG. 7, at flow step 806. At flow step 808, the total number of blocks in current private blockchain 402 for its associated smart contract may be obtained, for example, by a query based on the private contract, or for example, by analyzing or querying the private block index, or by traversing the blockchain using the index, counting the number of private blocks traversed.

At flow step 810, a public block hash is obtained using the private block hash obtained from private blockchain 402 by flow step 802. The public block hash is obtained by obtaining a public block index for the smart contract of public blockchain 404, at flow step 812 and obtaining the current total number of blocks of the public blockchain 404, for the smart contract associated with the public blockchain 404 (e.g., the private contract stored in one or more blocks of the public blockchain 404), at flow step 814.

For example, as part of the processing of obtaining, via the blockchain API component 532, the public block fingerprint hash discussed with regard to FIG. 7 (and corresponding step 412 of FIG. 4), the smart contract for public blockchain 404 is accessed (and executed), and an index for the currently stored blocks of public blockchain 404 may be obtained, at flow step 812. For example, the index may be used for traversing the blocks of public blockchain 404, or for accessing a particular block of public blockchain 404 that is associated with particular information. At flow step 814, the total number of blocks in current public blockchain 404 for the particular user's associated smart contract may be obtained, for example, by a query based on the private contract, or for example, by analyzing or querying the public block index, or by traversing the blockchain using the index, counting the number of public blocks traversed that are associated with the user's smart contract.

At flow step 820, a determination is made as to whether the private block hash exists in the public blockchain. For example, such a determination may be made as discussed with regard to FIG. 7, and/or as discussed with regard to steps 412 and 414 of FIG. 4. Responsive to determining that the private block hash is not stored in the public blockchain 404, a status value indicating a "compromised" status may be returned, for example, to document manager 528.

At flow step 822, a determination is made as to whether a match can be determined between the obtained current private block index and the obtained current public block index (e.g., via blockchain API component 532). For example, by analyzing only the indexes, it may be determined whether each previous private block fingerprint stored in the obtained current private block index is also stored in the obtained current public block index. If not, then a status value indicating a "compromised" status may be returned, for example, to document manager 528. For example, it may be determined whether the opposite is true (e.g., by analyzing only the indexes, it may be determined whether each previous private block fingerprint stored in the obtained current public block index is also stored as respective previous block fingerprints in the obtained current private block index). For example, if either, or both, are true, then control may be passed to flow step 824. For example, if either, or both, are false, then a status value indicating a "compromised" status may be returned, for example, to document manager 534.

At flow step 824, it may be determined whether any further validation is requested. If not, then a status value indicating a "valid" status may be returned, for example, to document manager 528. If more validation is requested, at flow step 824, control may pass to flow step 826. At flow step 824, it may be determined whether the current total number of public blocks for the particular user's public blockchain 404 smart contract matches the current total number of private blocks for the particular user's private blockchain 402 smart contract. For example, if the total numbers do not match, then a presumption may be inferred that changes were made to the private blockchain 402 that were not also registered in public blockchain 404. For example, if the current total numbers of blocks do not match, then a status value indicating a "compromised" status may be returned, for example, to document manager 534; otherwise, control may be passed to flow step 828.

At flow step 828, each private block of private blockchain 402 may be traversed and compared with similarly traversed public blocks of public blockchain 404, to determine whether each previous private block fingerprint stored in public blockchain 404 aligns with each private block fingerprint in private blockchain 402, in the same order of adding the fingerprints, for each respective blockchain associated with the particular user (e.g., using backwards, or reverse, traversal on the ordering of nodes in each blockchain—i.e., most recently added is accessed first, followed by next most recently added, etc.). For example, if the respective fingerprints are stored in respective obtained blockchain indexes, then the traversal may be performed on the respective indexes only (i.e., no further accesses to either blockchain for the respective traversals). In this manner, validity may be checked, without incurring significant overhead in processing resources needed for blockchain node accesses. If a match is not found for even a single respective block involved in the respective traversals, then a status value indicating a "compromised" status may be returned, for example, to document manager 528. However, if the respective matches are found, then a status value indicating a "valid" status may be returned, for example, to document manager 534.

Figure 9:
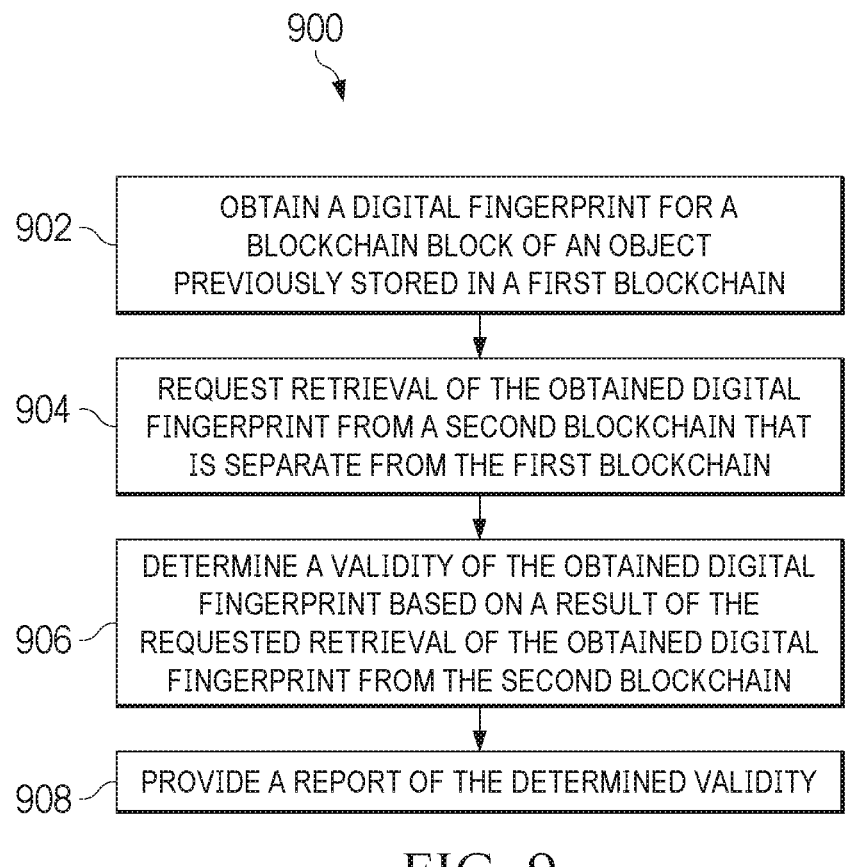
FIG. 9 is a flowchart illustrating one embodiment of a method for determining validity of a digital fingerprint of a block in a private blockchain.

FIG. 9 is a flowchart illustrating one embodiment of a method 900 for verifying data integrity. In one embodiment, the steps of FIG. 9 may be embodied as computer-executable instructions stored on a non-transitory, computer-readable medium.

At step 902, a digital fingerprint for a blockchain block of an object previously stored in a first blockchain is obtained based on requesting a new block in the first blockchain, the new block automatically storing the digital fingerprint as a fingerprint of a most recent previous block to be added to the first blockchain. For example, the new block 104 is added to private blockchain 102, as discussed with regard to FIG. 1.

At step 904, retrieval of the obtained digital fingerprint from a second blockchain that is separate from the first blockchain is requested. For example, content validation component 534 may obtain the digital fingerprint from private blockchain 402 and initiate retrieval of the obtained digital fingerprint from public blockchain 404 via the blockchain API component 532, as discussed with regard to FIG. 7.

At step 906, a validity of the obtained digital fingerprint is determined based on a result of the requested retrieval of the obtained digital fingerprint from the second blockchain. For example, the blockchain API component 532 may be utilized to determine the validity, as discussed with regard to FIG. 7.

At step 908, a report of the determined validity is provided. For example, the blockchain API component 532 may be utilized to provide the report of the determined validity to content validation component 534 (e.g., document manager 528), as discussed with regard to FIG. 7.

FIG. 9 is merely an illustrative example, and the disclosed subject matter is not limited to the ordering or number of steps illustrated. Embodiments may implement additional steps or alternative steps, omit steps, or repeat steps.

FIG. 10 is a flowchart illustrating one embodiment of a method 1000 for verifying data integrity. In one embodiment, the steps of FIG. 10 may be embodied as computer-executable instructions stored on a non-transitory, computer-readable medium.

At step 1002, storage of an object in a first blockchain is initiated. For example, content manager 602 (e.g., document manager 528) may initiate storage of a document hash and metadata in private blockchain 402 via blockchain API component 532, as discussed with regard to FIG. 6.

At step 1004, responsive to storage of the object in the first blockchain, a digital fingerprint of a block in the first blockchain in which the object has been most recently previously stored in the first blockchain storage is obtained. For example, content manager 602 (e.g., document manager 528) may obtain the digital fingerprint of the block from the private blockchain 402 via blockchain API component 532, as discussed with regard to FIG. 6.

At step 1006, storage of the obtained digital fingerprint of the block in a second blockchain that is separate from the first blockchain is initiated. For example, content manager 602 (e.g., document manager 528) may initiate storage of the obtained digital fingerprint of the block in the public blockchain 404 via blockchain API component 532, as discussed with regard to FIG. 6.

At step 1008, integrity of the object stored in the first blockchain is verified based on initiating retrieval of the object from the first blockchain, and determining whether a retrieved block digital fingerprint of the first blockchain that is obtained as a result of the initiated retrieval of the object from the first blockchain is stored in the second blockchain. For example, content manager 602 (e.g., document manager 528) may verify integrity of the object stored in private blockchain 402, as discussed with regard to FIG. 7.

FIG. 10 is merely an illustrative example, and the disclosed subject matter is not limited to the ordering or number of steps illustrated. Embodiments may implement additional steps or alternative steps, omit steps, or repeat steps.

Figure 11:
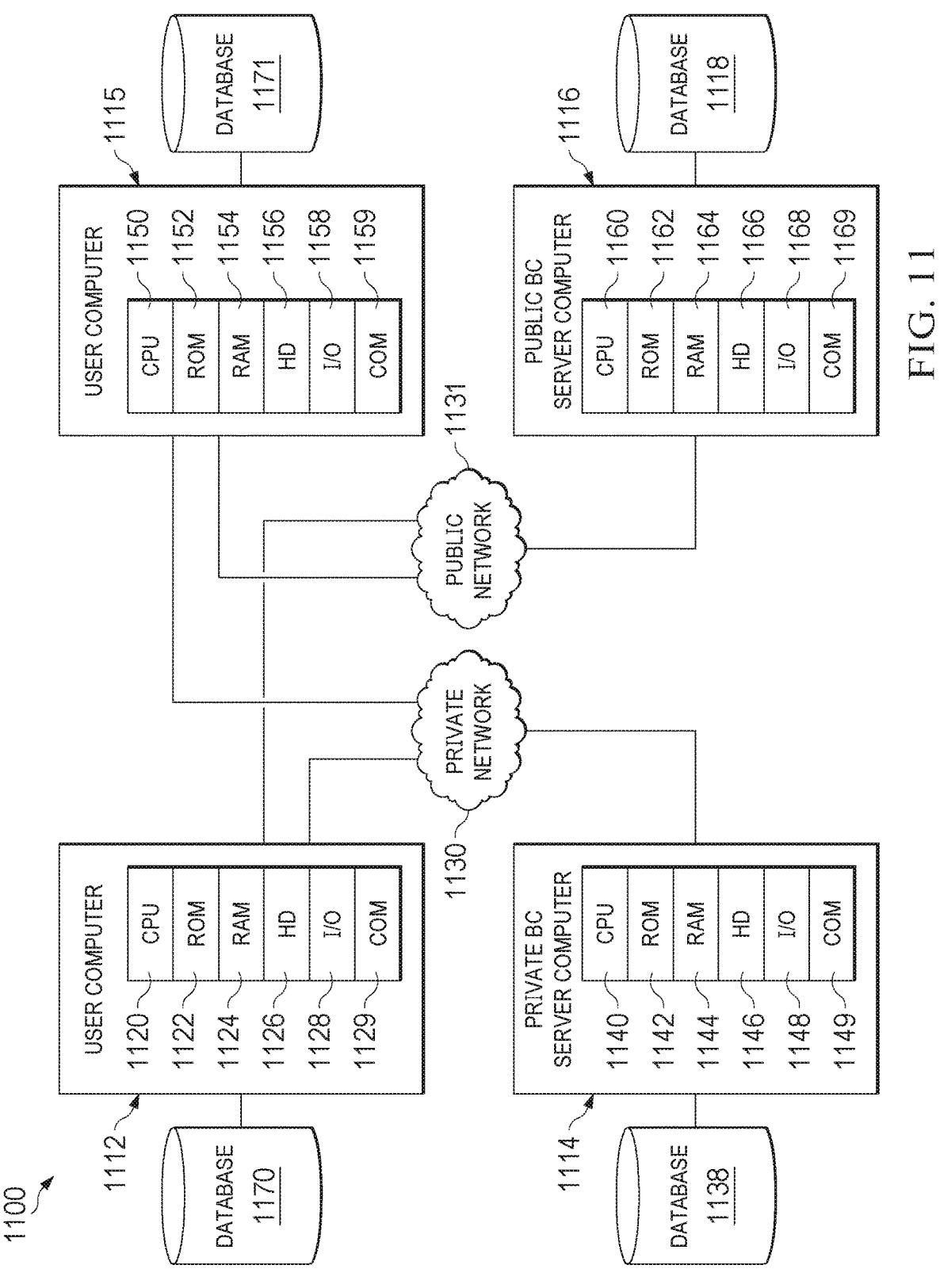
FIG. 11 depicts a diagrammatic representation of a distributed network computing environment where embodiments disclosed herein can be implemented.

FIG. 11 depicts a diagrammatic representation of a distributed network computing environment where embodiments disclosed can be implemented. In the example of FIG. 11, network computing environment 1100 may include private network 1130 and public network 1131, each of which can be bi-directionally coupled to user computer 1112, user computer 1115, private blockchain server computer 1114, and public blockchain server computer 1116. Private blockchain server computer 1114 can be bi-directionally coupled to database 1138 and public blockchain server computer 1116 can be bi-directionally coupled to database 1118. Each of private network 1130 and public network 1131 may represent a combination of wired and wireless networks that network computing environment 1100 may be utilized for various types of network communications known to those skilled in the art.

For the purpose of illustration, a single system is shown for each of user computer 1112, user computer 1115, private blockchain server computer 1114, and public blockchain server computer 1116. However, within each of user computer 1112, user computer 1115, private blockchain server computer 1114, and public blockchain server computer 1116, a plurality of computers (not shown) may be interconnected to each other over network 1130. For example, a plurality of user computers may be communicatively connected over private network 1130 to private blockchain server computer 1114 that operates a private blockchain system in an enterprise computing environment and a plurality of user computers may be communicatively connected over public network 1131 to public blockchain server computer 1116 implementing a public blockchain system.

User computers 1112 may include data processing systems for communicating with private blockchain server computer 1114 and public blockchain server computer 1116. For example, user computers 1112 may include one or more enterprise content management systems (e.g., CMS 504, OPENTEXT CORE CONTENT devices) utilizing private blockchains and public blockchains for verifying data integrity. Likewise, user computers 1115 may include data processing systems for communicating with private blockchain server computer 1114 and public blockchain server computer 1116. For example, user computers 1115 may include one or more enterprise content management systems (e.g., CMS 504, OPENTEXT CORE CONTENT devices) utilizing private blockchains and public blockchains for verifying data integrity. For example, database 1138 may store all or a portion of a private blockchain. For example, database 1118 may store all or a portion of a public blockchain. For example, private blockchain server computer 1114 may operate as part of a decentralized network of computers hosting a private blockchain. For example, public blockchain server computer 1116 may operate as part of a decentralized network of computers hosting a public blockchain.

User computer 1112 can include central processing unit ("CPU") 1120, read-only memory ("ROM") 1122, random access memory ("RAM") 1124, storage memory 1126 (e.g., a hard drive (HD) or other persistent storage memory), and input/output device(s) ("I/O") 1128, and communications interface 1129. I/O 1128 can include a keyboard, monitor, printer, electronic pointing device (e.g., mouse, trackball, stylus, etc.), or the like. Communications interface 1129 may include a communications interface, such as one or more network interface cards or application programming interfaces (APIs), to interface with private network 1130 and public network 1131. User computer 1112 can include an enterprise content management system server, a desktop computer, a laptop computer, a personal digital assistant, a cellular phone, or nearly any device capable of communicating over a network. User computer 1115 may be similar to user computer 1112 and can comprise CPU 1150, ROM 1152, RAM 1154, HD 1156, I/O 1158, and communications interface 1159. For example, documents for which transactions are to be securely stored in a private blockchain may be maintained and managed by user computer 1112 and/or user computer 1115.

Likewise, private blockchain server computer 1114 may include CPU 1140, ROM 1142, RAM 1144, HD 1146, I/O 1148, and communications interface 1149 and public blockchain server computer 1116 may include CPU 1160, ROM 1162, RAM 1164, HD 1166, I/O 1168, and communications interface 1169. Server computers 1114 and 1116 may each include one or more backend systems configured for providing an instance of an application to user computers 1112 over network 1130. Each of private blockchain server computer 1114 and public blockchain server computer 1116 may store and maintain a type of smart contract for handling transactions on information stored in the respective private blockchain or public blockchain. For example, code to be utilized for storage, retrieval, and user endorsement of new transactions for authorized users may be stored in a block of the respective private blockchain or public blockchain. For example, a smart contract may typically handle business logic agreed to by members of the particular network involved. Many other alternative configurations are possible and known to skilled artisans.

Each of the computers in FIG. 11 may have more than one CPU, ROM, RAM, HD, I/O, or other hardware components. For the sake of brevity, each computer is illustrated as having one of each of the hardware components, even if more than one is used. Each of computers 1112, 1114, 1115, and 1116 is an example of a data processing system. ROM 1122, 1142, 1152, and 1162; RAM 1124, 1144, 1154, and 1164; storage memory 1126, 1146, 1156, and 1166; and databases 1118, 1138, 1170, and 1171 can include media that can be read by CPU 1120, 1140, 1150, or 1160. Therefore, these types of memories include non-transitory computer-readable storage media. These memories may be internal or external to computers 1112, 1114, 1115, or 1116.

Portions of the methods described herein may be implemented in suitable software code that may reside within ROM 1122, 1142, 1152, or 1162; RAM 1124, 1144, 1154, or 1164; or storage memory 1126, 1146, 1156, or 1166. In addition to those types of memories, the instructions in an embodiment disclosed herein may be contained on a data storage device with a different computer-readable storage medium, such as a hard disk. Alternatively, the instructions may be stored as software code elements on a data storage array, magnetic tape, floppy diskette, optical storage device, or other appropriate data processing system readable medium or storage device.

Those skilled in the relevant art will appreciate that the invention can be implemented or practiced with other computer system configurations, including without limitation multi-processor systems, network devices, mini-computers, mainframe computers, data processors, and the like. The invention can be embodied in a computer or data processor that is specifically programmed, configured, or constructed to perform the functions described in detail herein. The invention can also be employed in distributed computing environments, where tasks or modules are performed by remote processing devices, which are linked through a communications network such as a local area network (LAN), wide area network (WAN), and/or the Internet. In a distributed computing environment, program modules or subroutines may be located in both local and remote memory storage devices. These program modules or subroutines may, for example, be stored or distributed on computer-readable media, including magnetic and optically readable and removable computer discs, stored as firmware in chips, as well as distributed electronically over the Internet or over other networks (including wireless networks). Example chips may include Electrically Erasable Programmable Read-Only Memory (EEPROM) chips. Embodiments discussed herein can be implemented in suitable instructions that may reside on a non-transitory computer readable medium, hardware circuitry or the like, or any combination and that may be translatable by one or more server machines.

ROM, RAM, and HD are computer memories for storing computer-executable instructions executable by the CPU or capable of being compiled or interpreted to be executable by the CPU. Suitable computer-executable instructions may reside on a computer readable medium (e.g., ROM, RAM, and/or HD), hardware circuitry or the like, or any combination thereof. Within this disclosure, the term "computer readable medium" is not limited to ROM, RAM, and HD and can include any type of data storage medium that can be read by a processor. A "computer-readable medium" may be any type of data storage medium that can store computer instructions that are translatable by a processor. Examples of computer-readable media can include, but are not limited to, volatile and non-volatile computer memories and storage devices such as random access memories, read-only memories, hard drives, data cartridges, direct access storage device arrays, magnetic tapes, floppy diskettes, flash memory drives, optical data storage devices, compact-disc read-only memories, and other appropriate computer memories and data storage devices. Thus, a computer-readable medium may refer to a data cartridge, a data backup magnetic tape, a floppy diskette, a flash memory drive, an optical data storage drive, a CD-ROM, ROM, RAM, HD, or the like. Data may be stored in a single storage medium or distributed through multiple storage mediums, and may reside in a single database or multiple databases (or other data storage).

A "processor" includes any hardware system, mechanism or component that processes data, signals or other information. A processor can include a system with a central processing unit, multiple processing units, dedicated circuitry for achieving functionality, or other systems. Processing need not be limited to a geographic location or have temporal limitations. For example, a processor can perform its functions in "real-time," "offline," in a "batch mode," etc. Portions of processing can be performed at different times and at different locations, by different (or the same) processing systems.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments can be implemented in a computer communicatively coupled to a network (for example, the Internet, an intranet, an internet, a WAN, a LAN, a SAN, etc.), another computer, or in a standalone computer. As is known to those skilled in the art, the computer can include a central processing unit CPU or other processor, memory (e.g., primary or secondary memory such as RAM, ROM, HD or other computer readable medium for the persistent or temporary storage of instructions and data) and an input/output ("I/O") device. The I/O device can include a keyboard, monitor, printer, electronic pointing device (for example, mouse, trackball, stylus, etc.), touch screen or the like. In embodiments, the computer has access to at least one database on the same hardware or over the network.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only to those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, a term preceded by "a" or "an" (and "the" when antecedent basis is "a" or "an") includes both singular and plural of such term, unless clearly indicated within the claim otherwise. Also, as used in the description herein and throughout the meaning of "in" includes "in" and "on" unless the context clearly dictates otherwise.

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such nonlimiting examples and illustrations includes, but is not limited to: "for example," "for instance," "e.g.," "in one embodiment."

Reference throughout this specification to "one embodiment," "an embodiment," or "a specific embodiment" or similar terminology means that a particular feature, structure, or characteristic described in connection with the embodiment is included in at least one embodiment and may not necessarily be present in all embodiments. Thus, respective appearances of the phrases "in one embodiment," "in an embodiment," or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

It will also be appreciated that one or more of the elements depicted in the figures can also be implemented in a more separated or integrated manner, or even removed or rendered as inoperable in certain cases, as is useful in accordance with a particular application. Additionally, any signal arrows in the figures should be considered only as exemplary, and not limiting, unless otherwise specifically noted.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component.

In the foregoing specification, the invention has been described with reference to specific embodiments. However, one of ordinary skill in the art appreciates that various modifications and changes can be made without departing from the scope of the invention. Accordingly, the specification, including the Summary, Abstract and figures are to be regarded in an illustrative rather than a restrictive sense, and all such modifications are intended to be included within the scope of invention.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention. At least portions of the functionalities or processes described herein can be implemented in suitable computer-executable instructions. The computer-executable instructions may reside on a computer readable medium, hardware circuitry or the like, or any combination thereof.

Any suitable programming language can be used to implement the routines, methods or programs of embodiments of the invention described herein, including C, C++, Java, JavaScript, HTML, or any other programming or scripting code, etc. Different programming techniques can be employed such as procedural or object oriented. Other software/hardware/network architectures may be used. Communications between computers implementing embodiments can be accomplished using any electronic, optical, radio frequency signals, or other suitable methods and tools of communication in compliance with known network protocols.

As one skilled in the art can appreciate, a computer program product implementing an embodiment disclosed herein may comprise a non-transitory computer readable medium storing computer instructions executable by one or more processors in a computing environment. The computer readable medium can be, by way of example only but not by limitation, an electronic, magnetic, optical or other machine-readable medium. Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices.

Particular routines can execute on a single processor or multiple processors. Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. Functions, routines, methods, steps and operations described herein can be performed in hardware, software, firmware or any combination thereof.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Generally then, although the invention has been described with respect to specific embodiments thereof, these embodiments are merely illustrative, and not restrictive of the invention. Rather, the description is intended to describe illustrative embodiments, features and functions in order to provide a person of ordinary skill in the art context to understand the invention without limiting the invention to any particularly described embodiment, feature or function, including any such embodiment feature or function described. While specific embodiments of, and examples for, the invention are described herein for illustrative purposes only, various equivalent modifications are possible within the spirit and scope of the invention, as those skilled in the relevant art will recognize and appreciate.

As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

What is claimed is:

1. A method comprising:
obtaining a digital fingerprint for a blockchain block of an object previously stored in a first blockchain based on requesting a new block in the first blockchain, the new block automatically storing the digital fingerprint as a fingerprint of a most recent previous block to be added to the first blockchain;
requesting retrieval of the obtained digital fingerprint from a second blockchain that is separate from the first blockchain, the second blockchain storing the obtained digital fingerprint and the first blockchain storing object data not also stored in the second blockchain, wherein the second blockchain stores the obtained digital fingerprint after a contract is executed to obtain a consensus on a requested content action;
determining a validity of the obtained digital fingerprint based on a result of the requested retrieval of the obtained digital fingerprint from the second blockchain; and
providing a report of the determined validity.

2. The method of claim 1, wherein determining the validity of the obtained digital fingerprint comprises determining that the obtained digital fingerprint is invalid, responsive to determining that the obtained digital fingerprint is not found in the second blockchain.

3. The method of claim 1, wherein the first blockchain comprises a private blockchain and the second blockchain comprises a public blockchain.

4. The method of claim 1, wherein determining the validity of the obtained digital fingerprint comprises determining that the obtained digital fingerprint is valid, responsive to determining that the obtained digital fingerprint is found in the second blockchain.

5. The method of claim 1, wherein the digital fingerprint comprises a digital fingerprint of the new block which is newly added and included in the first blockchain.

6. The method of claim 1, wherein the digital fingerprint comprises a hash value of the new block included in the first blockchain, wherein the object previously stored in the first blockchain was previously stored in the block.

7. The method of claim 1, wherein obtaining the digital fingerprint for the object previously stored in the first blockchain comprises accessing an application programming interface (API) that is configured to interface with the first blockchain.

8. A non-transitory computer-readable medium storing instructions that are executable by a processor for:
obtaining a digital fingerprint for a blockchain block of an object previously stored in a first blockchain based on requesting a new block in the first blockchain, the new block automatically storing the digital fingerprint as a fingerprint of a most recent previous block to be added to the first blockchain;
requesting retrieval of the obtained digital fingerprint from a second blockchain that is separate from the first blockchain, the second blockchain storing the obtained digital fingerprint and the first blockchain storing object data not also stored in the second blockchain, wherein the second blockchain stores the obtained digital fingerprint after a contract is executed to obtain a consensus on a requested content action;
determining a validity of the obtained digital fingerprint based on a result of the requested retrieval of the obtained digital fingerprint from the second blockchain; and
providing a report of the determined validity.

9. The non-transitory computer-readable medium of claim 8, wherein determining the validity of the obtained digital fingerprint comprises determining that the obtained digital fingerprint is invalid, responsive to determining that the obtained digital fingerprint is not found in the second blockchain.

10. The non-transitory computer-readable medium of claim 8, wherein the first blockchain comprises a private blockchain and the second blockchain comprises a public blockchain.

11. The non-transitory computer-readable medium of claim 8, wherein determining the validity of the obtained digital fingerprint comprises determining that the obtained digital fingerprint is valid, responsive to determining that the obtained digital fingerprint is found in the second blockchain.

12. The non-transitory computer-readable medium of claim 8, wherein the digital fingerprint comprises a digital fingerprint of the new block that is newly added and included in the first blockchain.

13. The non-transitory computer-readable medium of claim 8, wherein the digital fingerprint comprises a hash value of the new block included in the first blockchain, wherein the object previously stored in the first blockchain was previously stored in the block.

14. The non-transitory computer-readable medium of claim 8, wherein obtaining the digital fingerprint for the object previously stored in the first blockchain comprises accessing an application programming interface (API) that is configured to interface with the first blockchain.

15. A computer-implemented method comprising:
initiating storage of an object in a first blockchain;
responsive to storage of the object in the first blockchain, obtaining a digital fingerprint of a block in the first blockchain in which the object has been most recently previously stored in the first blockchain;
initiating storage of the obtained digital fingerprint of the block in a second blockchain that is separate from the first blockchain, the second blockchain storing the obtained digital fingerprint and the first blockchain storing object data not also stored in the second blockchain, wherein the second blockchain stores the obtained digital fingerprint after a contract is executed to obtain a consensus on a requested content action;

verifying integrity of the object stored in the first blockchain based on:

initiating retrieval of the object from the first blockchain, and determining whether a retrieved block digital fingerprint of the first blockchain that is obtained as a result of the initiated retrieval of the object from the first blockchain is stored in the second blockchain.

16. The computer-implemented method of claim 15, wherein verifying integrity of the object stored in the first blockchain comprises determining that the retrieved block digital fingerprint is invalid, responsive to determining that the retrieved block digital fingerprint is not stored in the second blockchain.

17. The computer-implemented method of claim 15, wherein the first blockchain comprises a private blockchain and the second blockchain comprises a public blockchain.

18. The computer-implemented method of claim 15, wherein verifying integrity of the object stored in the first blockchain comprises determining that the retrieved block digital fingerprint is valid, responsive to determining that the retrieved block digital fingerprint is stored in the second blockchain.

19. The computer-implemented method of claim 15, wherein the digital fingerprint comprises a hash value of a new block newly added in the first blockchain.

20. The computer-implemented method of claim 15, wherein initiating storage of the object in the first blockchain comprises accessing an application programming interface (API) that is configured to interface with the first blockchain.

* * * * *